(12) United States Patent
Jung et al.

(10) Patent No.: US 11,650,441 B2
(45) Date of Patent: May 16, 2023

(54) DISPLAY DEVICE AND METHOD OF MANUFACTURING THE SAME

(71) Applicant: Samsung Display Co., Ltd., Yongin-si (KR)

(72) Inventors: Jin Soo Jung, Hwaseong-si (KR); Young Gu Kim, Yongin-si (KR); Taek Joon Lee, Hwaseong-si (KR); Hye Lim Jang, Hwaseong-si (KR); Baek Kyun Jeon, Yongin-si (KR); Kyung Seon Tak, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 261 days.

(21) Appl. No.: 17/074,528

(22) Filed: Oct. 19, 2020

(65) Prior Publication Data

US 2021/0048712 A1 Feb. 18, 2021

Related U.S. Application Data

(62) Division of application No. 15/883,064, filed on Jan. 29, 2018, now Pat. No. 10,852,580.

(30) Foreign Application Priority Data

Sep. 4, 2017 (KR) .......................... 10-2017-0112734

(51) Int. Cl.
*G02F 1/11* (2006.01)
*G02F 1/1335* (2006.01)
(Continued)

(52) U.S. Cl.
CPC .......... *G02F 1/11* (2013.01); *G02F 1/133512* (2013.01); *G02F 1/133514* (2013.01);
(Continued)

(58) Field of Classification Search
CPC .......... G02B 5/285; G02B 5/201; G02B 5/28; G02B 5/284; G02B 5/286; G02B 5/288;
(Continued)

(56) References Cited

U.S. PATENT DOCUMENTS 9,182,631 B2 11/2015 Iwata et al.
10,996,515 B2 5/2021 Kim et al.
(Continued)

FOREIGN PATENT DOCUMENTS

CN 103733243 6/2014
CN 106483703 3/2017
(Continued)

OTHER PUBLICATIONS

Extended European Search Report dated Oct. 18, 2018, in European Patent Application No. 18168321.0.
(Continued)

*Primary Examiner* — Darryl J Collins
*Assistant Examiner* — Tamara Y. Washington
(74) *Attorney, Agent, or Firm* — H.C. Park & Associates, PLC

(57) ABSTRACT

A display device including: a first substrate; first through third subpixel electrodes which are disposed on the first substrate to neighbor each other; a second substrate opposing the first substrate; a first wavelength conversion pattern at least partially overlapping the first subpixel electrode and a second wavelength conversion pattern at least partially overlapping the second subpixel electrode; a first light transmission pattern at least partially overlapping the third subpixel electrode and a second light transmission pattern disposed between the first wavelength conversion pattern and the second wavelength conversion pattern; and a low refractive layer which has a lower refractive index than the first and second wavelength conversion patterns.

7 Claims, 23 Drawing Sheets

(51) Int. Cl.
*G02F 1/13357* (2006.01)
*G02F 1/1343* (2006.01)
*G02F 1/1333* (2006.01)
*G02F 1/1337* (2006.01)
*G02F 1/1368* (2006.01)

(52) U.S. Cl.
CPC .. *G02F 1/133528* (2013.01); *G02F 1/133555* (2013.01); *G02F 1/133617* (2013.01); *G02F 1/134309* (2013.01); *G02F 1/1368* (2013.01); G02F 1/133357 (2021.01); G02F 1/133521 (2021.01); G02F 1/133536 (2013.01); G02F 1/133548 (2021.01); G02F 1/133565 (2021.01); G02F 1/133723 (2013.01); G02F 2201/121 (2013.01); G02F 2201/123 (2013.01); G02F 2202/36 (2013.01); G02F 2203/03 (2013.01)

(58) Field of Classification Search
CPC ............... G02B 5/287; G02F 1/133555; G02F 1/133512; G02F 1/133514; G02F 1/133528; G02F 1/133617; G02F 1/1343; G02F 1/133521; G02F 1/133565; G02F 1/133548; G02F 1/133357; G02F 1/133536; G02F 1/133723; G02F 1/1368; G02F 2201/121; G02F 2201/123; G02F 2202/36; G02F 2203/03; G01J 3/26; G01J 3/51; G01J 3/02; G01J 3/36; G01J 3/0259; G01J 3/2803; G01J 3/4406
See application file for complete search history.

(56) References Cited

U.S. PATENT DOCUMENTS

| | | |
|---|---|---|
| 2009/0262288 A1 | 10/2009 | Tsuchiya et al. |
| 2014/0168572 A1 | 6/2014 | Iwata et al. |
| 2014/0321101 A1 | 10/2014 | Kadowaki |
| 2014/0368766 A1 | 12/2014 | Shibata et al. |
| 2015/0205159 A1 | 7/2015 | Itou et al. |
| 2016/0306226 A1 | 10/2016 | Yoon et al. |
| 2016/0313599 A1 | 10/2016 | Kwon et al. |
| 2017/0153510 A1 | 6/2017 | Choi et al. |
| 2018/0107028 A1 | 4/2018 | Jung et al. |
| 2021/0263345 A1* | 8/2021 | Jung ................ G02F 1/133617 |

FOREIGN PATENT DOCUMENTS

| | | |
|---|---|---|
| EP | 3125032 | 2/2017 |
| EP | 3309604 | 4/2018 |
| JP | 2015-138123 | 7/2015 |
| KR | 10-2017-0014755 | 2/2017 |
| KR | 10-2017-0031613 | 3/2017 |
| KR | 10-2017-0051839 | 5/2017 |
| WO | 2012-161012 | 11/2012 |

OTHER PUBLICATIONS

Non-Final Office Action dated Jan. 13, 2020, in U.S. Appl. No. 15/883,064.
Notice of Allowance dated Jul. 28, 2020, in U.S. Appl. No. 15/883,064.
Office Action dated Jul. 14, 2021, issued in Korean Patent Application No. 10-2017-0112734.

* cited by examiner

DISPLAY DEVICE AND METHOD OF MANUFACTURING THE SAME

CROSS-REFERENCE TO RELATED APPLICATION

This application is a Divisional of U.S. patent application Ser. No. 15/883,064, filed on Jan. 29, 2018, and claims priority from and the benefit of Korean Patent Application No. 10-2017-0112734, filed on Sep. 4, 2017, which is hereby incorporated by reference for all purposes as if fully set forth herein.

BACKGROUND

Field

Exemplary embodiments relate to a display device and a method of manufacturing the same.

Discussion of the Background

With the development of multimedia, display devices are becoming increasingly important. Accordingly, various types of display devices such as liquid crystal displays (LCDs) and organic light-emitting displays (OLEDs) are being used.

Of these display devices, LCDs are one of the most widely used types of flat panel displays. An LCD includes a pair of substrates having field generating electrodes, such as pixel electrodes and a common electrode, and a liquid crystal layer interposed between the two substrates. In the LCD, voltages are applied to the field generating electrodes to generate an electric field in the liquid crystal layer. Accordingly, the alignment of liquid crystal molecules of the liquid crystal layer is determined, and the polarization of incident light is controlled. As a result, a desired image is displayed on the LCD.

As one way to make each pixel uniquely display one primary color, a color conversion pattern may be placed in each pixel on an optical path extending from a light source to a viewer. For example, a color filter may realize a primary color by transmitting only a specific wavelength band.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device which can improve light output efficiency by including a low refractive layer and a method of manufacturing the display device.

Exemplary embodiments provide a display device which provides flatness to a low refractive layer and a planarization layer by placing a light transmission pattern in a valley area between wavelength conversion patterns and a method of manufacturing the display device.

Additional aspects will be set forth in the detailed description which follows, and, in part, will be apparent from the disclosure, or may be learned by practice of the inventive concept.

According to exemplary embodiments, a display device comprises: a first substrate; first through third subpixel electrodes which are disposed on the first substrate to neighbor each other; a second substrate which is opposite the first substrate; wavelength conversion patterns which are disposed on the second substrate and comprise a first wavelength conversion pattern at least partially overlapping the first subpixel electrode and a second wavelength conversion pattern at least partially overlapping the second subpixel electrode; light transmission patterns which comprise a first light transmission pattern at least partially overlapping the third subpixel electrode and a second light transmission pattern disposed between the first wavelength conversion pattern and the second wavelength conversion pattern; a planarization layer which is disposed on the wavelength conversion patterns and the light transmission patterns; and a low refractive layer which has a lower refractive index than the wavelength conversion patterns. The low refractive layer may comprise at least one of a first low refractive layer disposed between the wavelength conversion patterns and the second substrate and a second low refractive layer disposed between the wavelength conversion patterns and the planarization layer.

According to exemplary embodiments, a display device comprises: a backlight unit which emits light displaying a first color; and a display panel which receives the light displaying the first color. The display panel nay comprise: a substrate; wavelength conversion patterns which are disposed on the substrate and comprise a first wavelength conversion pattern converting the light displaying the first color into light displaying a second color different from the first color and a second wavelength conversion pattern converting the light displaying the first color into light displaying a third color different from the first color; light transmission patterns which comprise a first light transmission pattern transmitting the light displaying the first color and a second light transmission pattern disposed between the first wavelength conversion pattern and the second wavelength conversion pattern; and a low refractive layer which has a lower refractive index than the wavelength conversion patterns. The low refractive layer may comprise at least one of a first low refractive layer disposed between the wavelength conversion patterns and the substrate and a second low refractive layer disposed on the wavelength conversion patterns.

According to exemplary embodiments, a method of manufacturing a display device comprises: forming a first low refractive layer on a substrate; forming wavelength conversion patterns, which comprise a first wavelength conversion pattern converting light having a first wavelength band into light having a second wavelength band and a second wavelength conversion pattern converting the light having the first wavelength band into light having a third wavelength band, on the first low refractive layer; forming light transmission patterns which comprise a first light transmission pattern transmitting the light having the first wavelength band and a second light transmission pattern disposed between the first wavelength conversion pattern and the second wavelength conversion pattern; and forming a second low refractive layer on the wavelength conversion patterns and the light transmission patterns. Refractive indices of the first low refractive layer and the second low refractive layer may be lower than those of the wavelength conversion patterns.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
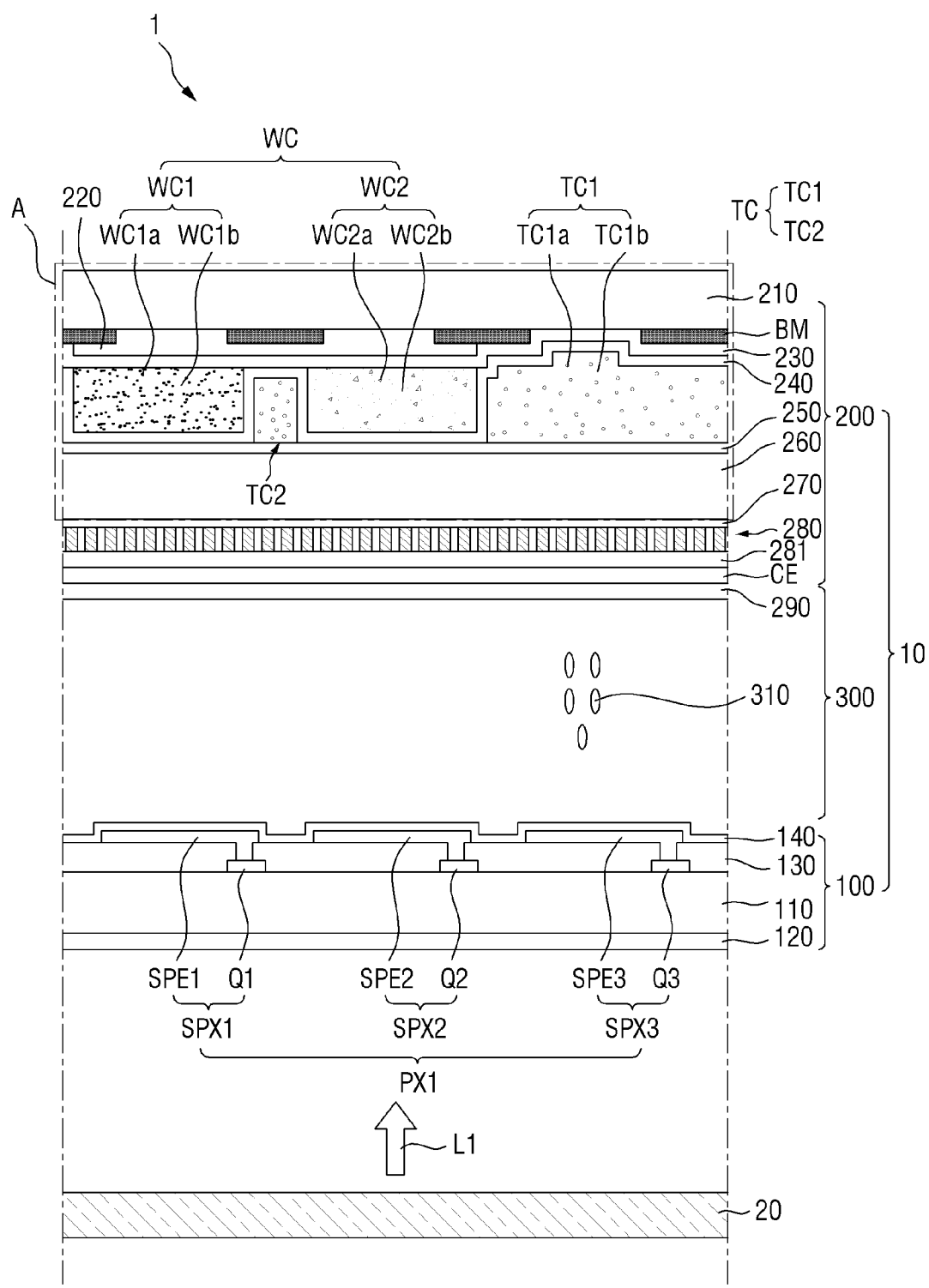
FIG. 1 is a cross-sectional view of a display device according to an embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments rill be described with reference to the accompanying drawings.

FIG. 1 is a cross-sectional view of a display device 1 according to an embodiment.

Referring to FIG. 1, the display device 1 according to the embodiment includes a display panel 10 and a backlight unit 20.

The display panel 10 displays an image. The display panel 10 may include a lower display panel 100, an upper display panel 200, and a liquid crystal layer 300. Here, the terms 'lower' and 'upper' are used for ease of description and are based on FIG. 1. The lower display panel 100 may be placed to face the upper display panel 200. The liquid crystal layer 300 may be interposed between the lower display panel 100 and the upper display panel 200 and may include a plurality of liquid crystal molecules 310. In an embodiment, the lower display panel 100 may be bonded to the upper display panel 200 by sealing.

The backlight unit 20 provides light to the display panel 10. More specifically, the backlight unit 20 may be disposed under the display panel 10 to provide light having a specific wavelength band to the display panel 10. Hereinafter, light provided from the backlight unit 20 to the display panel 10 will be referred to as light L1 having a first wavelength band.

The backlight unit 20 may emit the light L1 having the first wavelength band to the display panel 10. Here, the light L1 having the first wavelength band is defined as light displaying a first color. The first color may be blue having a center wavelength of about 420 to 480 nm in an embodiment. The center wavelength can also be expressed as a peak wavelength. That is, the light L1 having the first wavelength band is also defined as blue light whose center wavelength is in the range of about 420 to 480 nm. Therefore, the backlight unit 20 can provide blue light to the display panel 10. The display panel 10 is disposed on the path of the light L1 having the first wavelength band emitted from the backlight unit 20 and displays an image based on received light. The arrangement relationship between the display panel 10 and the backlight unit 20 is not limited to that illustrated in FIG. 1 as long as the display panel 10 is disposed on the path of light emitted from the backlight unit 20.

The backlight unit 20 may include a light source which emits the above light and a light guide plate which guides the light received from the light source to the display panel 10. The type of the light source is not particularly limited. The light source may include a light emitting diode (LED) or a laser diode (LD) in an embodiment. In addition, the material of the light guide plate is not particularly limited. The light guide plate may be made of glass, quartz, or a plastic material such as polyethylene terephthalate or polycarbonate in an embodiment.

Although not illustrated in the drawing, the backlight unit 20 may include at least one optical sheet. The optical sheet may include at least one of a prism sheet, a diffusion sheet, a lenticular lens sheet, and a micro lens sheet. The optical sheet can improve the display quality of the display device 1 by modulating optical characteristics of light emitted from the backlight unit 20, such as condensing, diffusion, scattering, or polarization characteristics.

The lower display panel 100, the upper display panel 200 and the liquid crystal layer 300 will hereinafter be described in more detail.

First, the lower display panel 100 will be described. The lower display panel 100 may include a lower substrate 110, a first polarizing layer 120, a plurality of pixels including a first pixel PX1, a first insulating layer 130, and a lower alignment film 140.

The lower substrate 110 may be a transparent insulating substrate in an embodiment. Here, the transparent insulating substrate may include a glass material, a quartz material, or a translucent plastic material. The lower substrate 110 may have flexibility in an embodiment.

The first polarizing layer 120 may be disposed on an optical path between the lower substrate 110 and the backlight unit 20. In an embodiment, the first polarizing layer 120 may be disposed under the lower substrate 110. However, the position of the first polarizing layer 120 is not limited to that illustrated in FIG. 1. In an embodiment, the first polarizing layer 120 may be disposed between the lower substrate 110 and the liquid crystal layer 300. The first polarizing layer 120 may be a reflective polarizing layer in an embodiment. When the first polarizing layer 120 is a reflective polarizing layer, it may transmit a polarization component parallel to a transmission axis and reflect a polarization component parallel to a reflection axis.

The first polarizing layer 120 may be in direct contact with the lower substrate 110 in an embodiment. That is, the first polarizing layer 120 may be formed on a surface of the lower substrate 110 through a continuous process.

In an embodiment, the first polarizing layer 120 may be bonded to the surface of the lower substrate 110 by an adhesive member. Here, the adhesive member may be a pressure sensitive adhesive member (PSA) or an optically clear adhesive member (OCA, OCR) in an embodiment.

The pixels including the first pixel PX1 may be disposed on the lower substrate 110. The pixels will hereinafter be described based on the first pixel PX1.

The first pixel PX1 may include first through third subpixels SPX1 through SPX3. Here, the first through third subpixels SPX1 through SPX3 display different colors. Each of the first through third subpixels SPX1 through SPX3 includes a switching element and a subpixel electrode. This will be described based on the first subpixel SPX1 by referring to FIG. 2.

Figure 2:
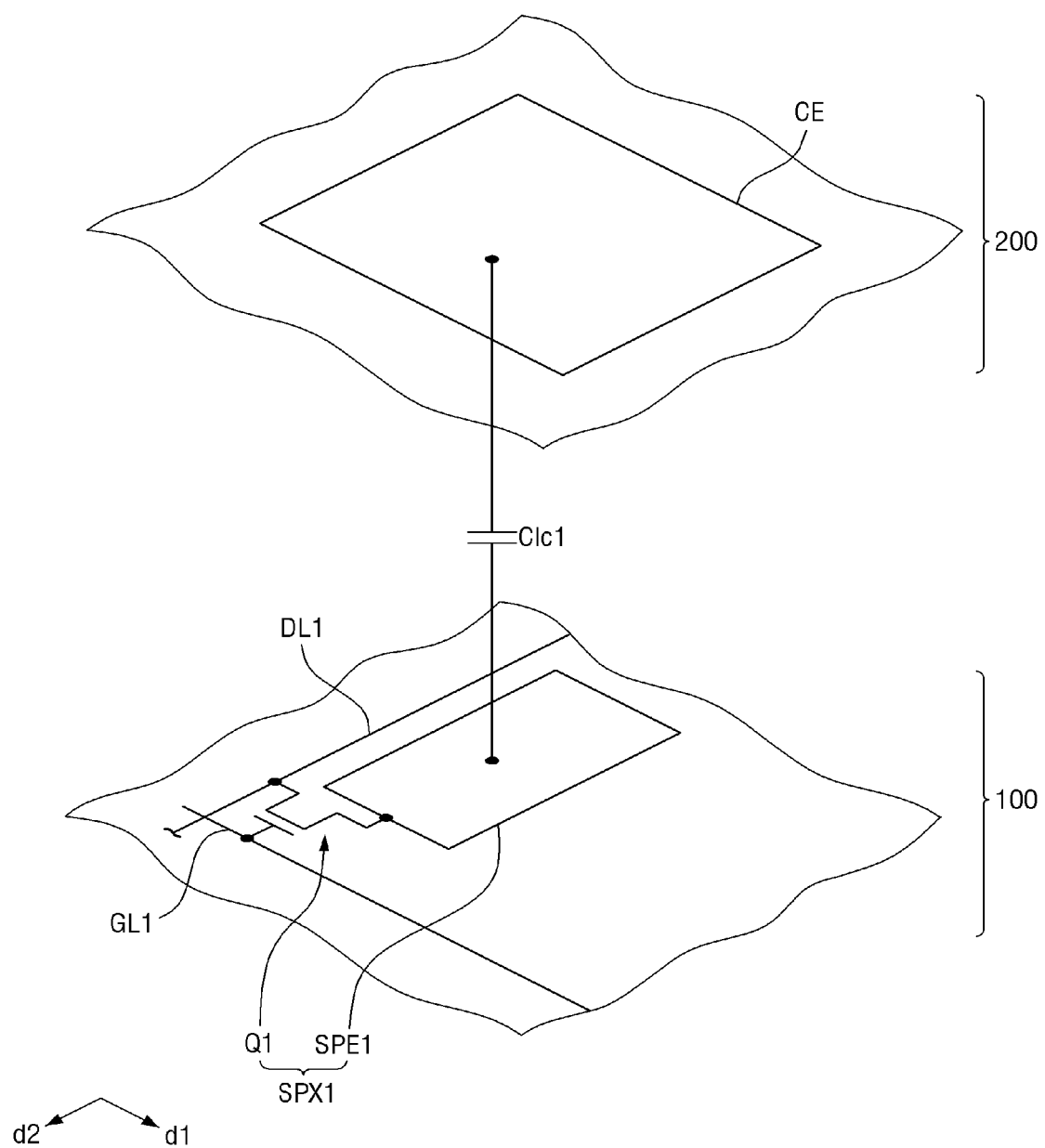
FIG. 2 is a schematic view of a first subpixel illustrated in FIG. 1.

FIG. 2 is a schematic view of the first subpixel SPX1 illustrated in FIG. 1.

Referring to FIGS. 1 and 2, a first switching element Q1 may be a three-terminal element such as a thin-film transistor in an embodiment. The first switching element Q1 may have a control electrode electrically connected to a first scan line GL1 and have one electrode electrically connected to a first data line DL1. The other electrode of the first switching element Q1 may be electrically connected to a first subpixel electrode SPE1. The first scan line GL1 may extend in a first direction d1 in an embodiment. The first data line DL1 may extend in a second direction d2, which is different from the first direction d1, in an embodiment. The first direction d1 intersects the second direction d2.

The first switching element Q1 may be turned on by a scan signal received from the first scan line GL1 to provide a data signal received from the first data line DL1 to the first subpixel electrode SPE1. In the present specification, the first subpixel SPX1 includes only one first switching element Q1. However, the inventive concept is not limited to this case, and two or more switching elements can be included.

The first subpixel electrode SPE1 may be disposed in the lower display panel 100. More specifically, the first subpixel electrode SPE1 may be disposed on the first insulating layer 130 located on the lower substrate 110. A common electrode CE may be located in the upper display panel 200 to be described later. The first subpixel electrode SPE1 may be overlapped by at least part of the common electrode CE. Therefore, the first subpixel SPX1 may further include a first liquid crystal capacitor Clc1 formed by the overlap of the first subpixel electrode SPE1 and the common electrode CE. In the present specification, when 'two elements overlap each other,' it means that the two elements overlap in a direction perpendicular to the lower substrate 110, unless otherwise specified.

Referring again to FIG. 1, the first insulating layer 130 may be disposed on the first through third switching elements Q1 through Q3. The first insulating layer 130 electrically insulates elements disposed under the first insulating layer 130 from elements disposed on the first insulating layer 130.

In an embodiment, the first insulating layer 130 may be made of an inorganic material such as silicon nitride or silicon oxide. In an embodiment, the first insulating layer 130 may include an organic material having an excellent planarization property and having photosensitivity. In an embodiment, the first insulating layer 130 may be formed as a stacked structure of a layer made of an organic material and a layer made of an inorganic material. The first insulating layer 130 may include a plurality of contact holes for electrically connecting the first through third switching elements Q1 through Q3 to the first through third subpixel electrodes SPE1 through SPE3, respectively.

The first through third subpixel electrodes SPE1 through SPE3 may be disposed on the first insulating layer 130 to neighbor each other. Each of the first through third subpixel electrodes SPE1 through SPE3 may be a transparent electrode or a translucent electrode or may be made of a reflective metal such as aluminum, silver, chromium or an alloy of these materials. Here, the transparent electrode or the translucent electrode may include one or more of indium tin oxide (ITO), indium zinc oxide (IZO), zinc oxide (ZnO), indium oxide ($In_2O_3$), indium gallium oxide (IGO), and aluminum zinc oxide (AZO). Although not illustrated in the drawing, each of the first through third subpixel electrodes SPE1 through SPE3 may include a plurality of slits.

The lower alignment film 140 may be disposed on the first through third subpixel electrodes SPE1 through SPE3. The lower alignment film 140 may induce the initial alignment of the liquid crystal molecules 310 in the liquid crystal layer 300. The lower alignment film 140 may include a polymer organic material having an imide group in a repeating unit of a main chain in an embodiment.

Next, the upper display panel 200 will be described. The upper display panel 200 may include an upper substrate 210, a black matrix BM, wavelength conversion patterns WC, light transmission patterns TC, a first filter 220, a first low refractive layer 230, a second filter 240, a second low refractive layer 250, a planarization layer 260, a second insulating layer 270, a second polarizing layer 280, the common electrode CE, and an upper alignment film 290.

The upper substrate 210 is placed to face the lower substrate 110. The upper substrate 210 may be made of transparent glass or plastic. In an embodiment, the upper substrate 210 may be made of the same material as the lower substrate 110.

The black matrix BM may be disposed on the upper substrate 210. The black matrix BM is disposed at boundaries between the pixels and prevents transmission of light, thereby preventing color mixing between neighboring pixels. Based on FIG. 1, the black matrix BM is disposed at the boundaries between the first through third subpixels SPX1 through SPX3. The material of the black matrix BM is not particularly limited as long as it can block the transmission of light provided to the black matrix BM. In an embodiment, the black matrix BM may include an organic material or a metal material such as chromium.

Although not illustrated in the drawing, a protective layer may be disposed on the black matrix BM. More specifically, the protective layer may be disposed between the black matrix BM and the first filter 220 to described later. The protective layer can prevent the black matrix BM from being damaged or corroded during the process of manufacturing the upper display panel 200. The material of the protective layer is not particularly limited. However, the protective layer may include an inorganic insulating material such as silicon nitride or silicon oxide. The protective layer can be omitted.

Although not illustrated in the drawing, the black matrix BM can also be disposed in the lower display panel 100. When the black matrix BM is disposed in the lower display panel 100, it may be located between the first insulating layer 130 and the lower alignment film 140 in an embodiment. The black matrix BM disposed in the lower display panel 100 can prevent light scattered by the light transmission patterns TC from entering the wavelength conversion patterns WC, thereby suppressing color mixing.

In the present specification, when "a third element is disposed between a first element and a second element," it means that the position of the third element varies depending on the arrangement of the first element and the second element. That is, when the first element and the second element are arranged to overlap each other in the direction perpendicular to the lower substrate 110, the third element may be placed to overlap each of the first element and the second element in the direction perpendicular to the lower substrate 110. On the other hand, when the first element and the second element are arranged to overlap each other in a direction horizontal to the lower substrate 110, the third element may be placed to overlap each of the first element and the second element in the direction horizontal to the lower substrate 110. In the latter case, a second light transmission pattern TC2, which will be described later, is disposed between a first wavelength conversion pattern WC1 and a second wavelength conversion pattern WC2 which overlap each other in the direction horizontal to the lower substrate 110. This means that the second light transmission pattern TC2 is placed to overlap each of the first wavelength conversion pattern WC1 and the second wavelength conversion pattern WC2 in the direction horizontal to the lower substrate 110.

The first filter 220 may be disposed on the black matrix BM. More specifically, the first filter 220 may be disposed on the black matrix BM to overlap the wavelength conversion patterns WC and the second light transmission pattern TC2. In addition, the first filter 220 may not overlap with a first light transmission pattern TC1.

The first filter 220 may include an organic material having photosensitivity in an embodiment. The first filter 220 may have a thickness of about 0.5 to 2 μm or about 0.5 to 1.5 μm in an embodiment. When having a thickness of 0.5 μm or more, the first filter 220 can have sufficient absorptive power for light of a specific wavelength band. When the thickness of the first filter 220 is 2 μm or less, the height of a step formed by the first filter 220 can be minimized, and the distance between the wavelength conversion patterns WC and the black matrix BM can be minimized. Accordingly, a color mixing defect can be suppressed.

The first filter 220 may be a cut-off filter that transmits light having a specific wavelength band and blocks light having another specific wavelength band. This will be described later together with the wavelength conversion patterns WC by referring to FIG. 4.

The position of the filter 220 is not limited to that illustrated in FIG. 1 as long as the first filter 220 overlaps the wavelength conversion patterns WC and the second light transmission pattern TC2. For example, the black matrix BM can be disposed on the first filter 220. In an embodiment, the first filter 220 and the black matrix BM can be disposed on the same layer.

The first low refractive layer 230 may be disposed on the first filter 220. The first low refractive layer 230 may be disposed on the entire surfaces of the black matrix BM and the first filter 220 in an embodiment. Accordingly, the first low refractive layer 230 may overlap each of the first wavelength conversion pattern WC1, the second wavelength conversion pattern WC2, the first light transmission pattern TC1, and the second light transmission pattern TC2 in the direction perpendicular to the lower substrate 110.

The first low refractive layer 230 may be in contact with the first wavelength conversion pattern WC1 and the second wavelength conversion pattern WC2. On the other hand, the first low refractive layer 230 is not in contact with the first light transmission pattern TC1 and the second light transmission pattern TC2.

As used herein, the term 'low refractive layer' refers to a layer having a relatively low refractive index as compared with an adjacent element. Therefore, the first low refractive layer 230 may have a lower refractive index than the wavelength conversion patterns WC to be described later. For example, the first low refractive layer 230 may have a refractive index of about 1.1 to 1.4. On the other hand, the wavelength conversion patterns WC may have a refractive index of about 1.8 to 1.9 in an embodiment.

The first low refractive layer 230 may reflect a portion of light, which is emitted from the wavelength conversion patterns WC toward the upper substrate 210, back to the wavelength conversion patterns WC. That is, the first low refractive layer 230 may recycle at least a portion of the light emitted from the wavelength conversion patterns WC toward the upper substrate 210, thereby improving the light output efficiency. This will be described in more detail later with reference to FIG. 4.

The first low refractive layer 230 may include a resin and nano particles (such as zinc oxide (ZnO) or titanium dioxide ($TiO_2$)) dispersed in the resin. However, the material of the first low refractive layer 230 is not particularly limited as long as the refractive index of the first low refractive layer 230 is lower than those of the wavelength conversion patterns WC. In an embodiment, the first low refractive layer 230 may include one of hollow silica, nano silicate, and porogen.

The wavelength conversion patterns WC and the light transmission patterns TC will now be described in more detail with reference to FIG. 3.

Figure 3:
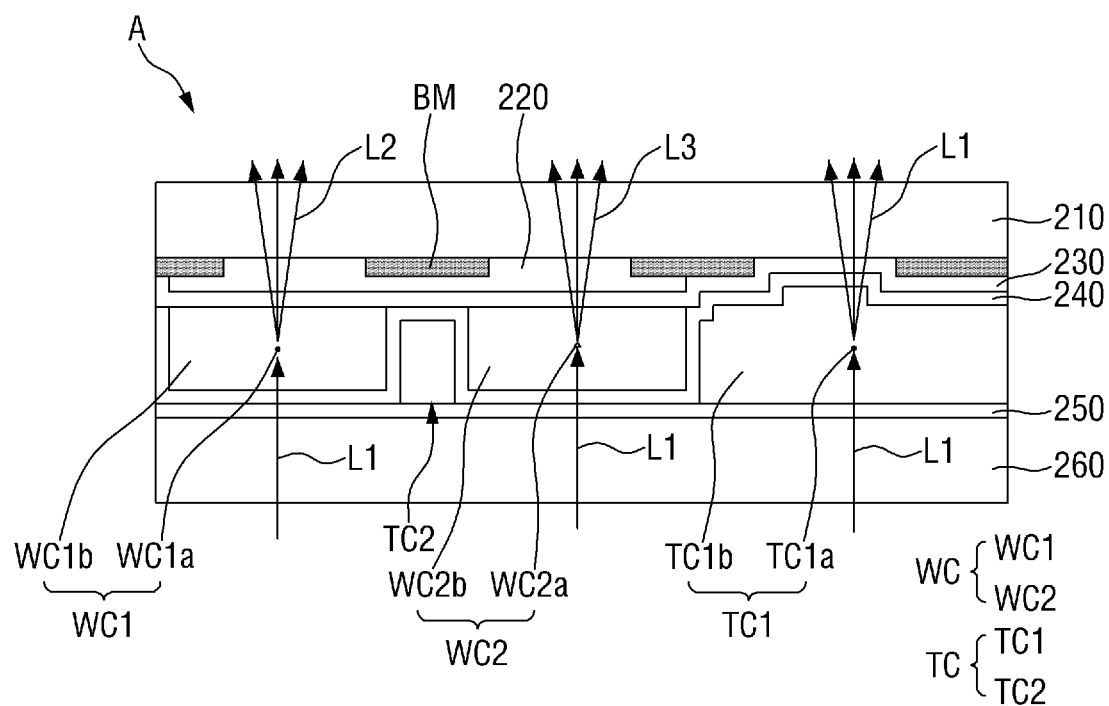
FIG. 3 is an enlarged view of an area A illustrated in FIG. 1.

FIG. 3 is an enlarged view of an area A illustrated in FIG. 1. For ease of description, one first wavelength conversion material WC1a, one second wavelength conversion material WC2a, and one light scattering material TC1a are illustrated in FIG. 3. In addition, the optical path change according to the refractive index is not taken into consideration in FIG. 3.

Referring to FIGS. 1 and 3, the wavelength conversion patterns WC may be disposed on the first low refractive layer 230. The wavelength conversion patterns WC may include a material capable of converting or shifting the wavelength band of light received from the outside. Accordingly, the wavelength conversion patterns WC can convert the display color of light emitted to the outside into a display color different from the display color of the light incident on the wavelength conversion patterns WC. The wavelength conversion patterns WC may include the first wavelength conversion pattern WC1 and the second wavelength conversion pattern WC2.

The first wavelength conversion pattern WC1 may be disposed on the first low refractive layer 230 and may overlap the first subpixel electrode SPE1 in the direction perpendicular to the lower substrate 110. The second wavelength conversion pattern WC2 may be disposed on the first low refractive layer 230 and may overlap the second subpixel electrode SPE2 in the direction perpendicular to the lower substrate 110.

More specifically, the first wavelength conversion pattern WC1 may receive the light L1 having the first wavelength band from the backlight unit 20, convert or shift the center wavelength of the light L1, and emit the light L1 having the converted or shifted center wavelength to the outside. The light L1 whose center wavelength has been converted by the first wavelength conversion pattern WC1 will be referred to as light L2 having a second wavelength band.

The light L2 having the second wavelength band displays a second color different from the first color. Here, the second color may be red having a center wavelength of about 600 to 670 nm in an embodiment. That is, the light L2 having the second wavelength band is also defined as red light whose center wavelength is in the range of about 600 to 670 nm. Therefore, the first wavelength conversion pattern WC1 can receive blue light from the backlight unit 20 and convert the blue light into red light.

The first wavelength conversion pattern WC1 will be described in more detail below. The first wavelength conversion pattern WC1 may include the first wavelength conversion material WC1a and a first light transmitting resin WC1b.

The first wavelength conversion material WC1a may be a material that converts the light L1 having the first wavelength band into the light L2 having the second wavelength band. The first wavelength conversion material WC1a may include first quantum dots in an embodiment. The particle size of the first quantum dots is not particularly limited as long as the first wavelength conversion material WC1a can convert the light L1 having the first wavelength band into the light L2 having the second wavelength band.

The first quantum dots may have a core-shell structure. The core may be a semiconductor nanocrystalline material. In an embodiment, the core of the first quantum dots may be selected from a group II-VI compound, a group III-V compound, a group IV-VI compound, a group IV element, a group IV compound, and combinations of these materials.

The group II-VI compound may be selected from a binary compound selected from CdSe, CdTe, ZnS, ZnSe, ZnTe, ZnO, HgS, HgSe, HgTe, MgSe, MgS and mixtures of these materials; a ternary compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and mixtures of these materials; and a quaternary compound selected from HgZnTeS, CdZnSeS, CdZnSeTe, CdZnSTe, CdHgSeS, CdHgSeTe, CdHgSTe, HgZnSeS, HgZnSeTe, HgZnSTe and mixtures of these materials.

The group III-V compound may be selected from a binary compound selected from GaN, GaP, GaAs, GaSb, AlN, AlP, AlAs, AlSb, InN, InP, InAs, InSb and mixtures of these materials; a ternary compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP and mixtures of these materials; and a quaternary compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and mixtures of these materials.

The group IV-VI compound may be selected from a binary compound selected from SnS, SnSe, SnTe, PbS; PbSe, PbTe and mixtures of these materials; a ternary compound selected from SnSeS, SnSeTe, SnSTe, PbSeS, PbSeTe, PbSTe, SnPbS, SnPbSe, SnPbSe and mixtures of these materials; and a quaternary compound selected from SnPbSSe, SnPbSeTe, SnPbSTe and mixtures of these materials. The group IV element may be selected from Si, Ge, and a mixture of these materials. The group IV compound may be a binary compound selected from SiC, SiGe, and a mixture of these materials.

Here, the binary compound, the ternary compound, or the quaternary compound may be present in particles at a uniform concentration or may be present in the same particles at non-uniform concentrations. In addition, the binary compound, the ternary compound, or the quaternary compound may have a core/shell structure in which one quantum dot surrounds another quantum dot. The interface between the core and the shell may have a concentration gradient in which the concentration of an element existing in the shell becomes lower toward the core.

The first wavelength conversion material WC1a may be dispersed in a naturally coordinated form in the first light transmitting resin WC1b. The first light transmitting resin WC1b is not particularly limited as long as it is a transparent medium that does not affect the wavelength conversion performance of the first wavelength conversion material WC1a and does not cause light absorption. For example, the first light transmitting resin WC1b may include an organic material such as epoxy resin or acrylic resin.

The second wavelength conversion pattern WC2 may receive the light L1 having the first wavelength band from the backlight unit 20, convert or shift the center wavelength of the light L1, and emit the light L1 having the converted or shifted center wavelength to the outside. The light L1 whose center wavelength has been converted by the second wavelength conversion pattern WC2 will be referred to as light L3 having a third wavelength band. The light L3 having the third wavelength band displays a third color different from the first color and the second color. Here, the third color may be green having a center wavelength of about 500 to 570 nm in an embodiment. That is, the light L3 having the third wavelength band is also defined as green light whose center wavelength is in the range of about 500 to 570 nm. Therefore, the second wavelength conversion pattern WC2 can receive blue light from the backlight unit 20 and convert the blue light into green light.

A sidewall of the second wavelength conversion pattern WC2 may be spaced apart from a sidewall of the first wavelength conversion pattern WC1. More specifically, the second light transmission pattern TC2 to be described later is disposed between the sidewall of the second wavelength conversion pattern WC2 and the sidewall of the first wavelength conversion pattern WC1. Accordingly, light emitted from the first wavelength conversion material WC1a in the first wavelength conversion pattern WC1 and light emitted from the second wavelength conversion material WC2a in the second wavelength conversion pattern WC2 can be prevented from being mixed with each other. This will be described later.

The second wavelength conversion pattern WC2 will now be described in more detail. The second wavelength conversion pattern WC2 may include the second wavelength conversion material WC2a and a second light transmitting resin WC2b.

The second wavelength conversion material WC2a may be a material that converts the light L1 having the first wavelength band into the light L3 having the third wavelength band. The second wavelength conversion material WC2a may include second quantum dots in an embodiment. The particle size of the second quantum dots is not particularly limited as long as the second wavelength conversion material WC2a can convert the light L1 having the first wavelength band into the light L3 having the third wavelength band. In an embodiment, the core of the second quantum dots may be selected from a group II-VI compound, a group III-V compound, a group IV-IV compound, a group IV element, a group IV compound, and combinations of these materials. Examples of each compound or element are the same as those described above in relation to the first quantum dots and thus will not be described.

The second wavelength conversion material WC2a may be dispersed in a naturally coordinated form in the second light transmitting resin WC2b. The second light transmitting resin WC2b is not particularly limited as long as it is a transparent medium that does not affect the wavelength conversion performance of the second wavelength conversion material WC2a and does not cause light absorption. For example, the second light transmitting resin WC2b may include an organic material such as epoxy resin or acrylic resin.

The first and second quantum dots may have a full width at half maximum (FWHM) of an emission wavelength spectrum of about 45 nm or less, preferably about 40 nm or less, more preferably about 30 nm or less in an embodiment. In this range, the first and second quantum dots can improve color purity or color reproducibility. In addition, since light emitted through the first quantum dots and the second quantum dots is radiated in all directions, a wide viewing angle can be improved.

The size (e.g., particle size) of the first quantum dots may be greater than the size of the second quantum dots in an embodiment. For example, the size of the first quantum dots may be about 55 to 65 Å. Also, the size of the second quantum dots may be about 40 to 50 Å Light emitted from each of the first and second quantum dots is radiated in various directions regardless of the incident angle of incident light.

In addition, each of the first and second quantum dots may be in the form of a spherical, pyramidal, multi-arm, or cubic nanoparticle, nanotube, nanowire, nanofiber, plate-like nanoparticle, or the like.

The light L2 having the second wavelength band emitted from the first wavelength conversion pattern WC1 and the light L3 having the third wavelength band emitted from the second wavelength conversion pattern WC2 may be in an unpolarized state through depolarization. As used herein, 'unpolarized light' refers to light that is not composed only of polarization components in a specific direction, that is, light that is not polarized only in a specific direction, in other words, light that is composed of random polarization components. An example of the unpolarized light is natural light.

In an embodiment, the first wavelength conversion pattern WC1 and the second wavelength conversion pattern WC2 may include a phosphor, a quantum rod or a phosphor material, in addition to the first and second quantum dots. Here, the phosphor may have a size of about 100 to 3000 nm in an embodiment. In addition, the phosphor may include a yellow, green, or red fluorescent material.

Before describing the light transmission patterns TC, the second filter 240 will be described first.

The second filter 240 may be disposed on the first wavelength conversion pattern WC1 and the second wavelength conversion pattern WC2. The second filter 240 may cover outer surfaces of the first wavelength conversion pattern WC1 and the second wavelength conversion pattern WC2. In addition, the second filter 240 may be disposed under the light transmission patterns TC which will be described later. In other words, the second filter 240 may be formed in the upper display panel 200 before the light transmission patterns TC.

The second filter 240 may be formed between the first wavelength conversion pattern WC1, the second wavelength conversion pattern WC2 and the light transmission patterns TC, so that the first wavelength conversion pattern WC1, the second wavelength conversion pattern WC2, and the light transmission patterns TC do not contact each other. Accordingly, this can prevent the color mixing of light emitted from the first wavelength conversion pattern WC1, the second wavelength conversion pattern WC2, and the light transmission patterns TC.

The second filter 240 may consist of a single layer or multiple layers. When consisting of multiple layers, the second filter 240 may include a SiNx layer and a SiOx layer stacked alternately in an embodiment. The second filter 240 may have an average thickness of about 0.5 to 2 μm or about 1 μm in an embodiment.

The second filter 240 may transmit light having a specific wavelength band and reflect light having another specific wavelength band. Here, the center wavelength of the light reflected by the second filter 240 may be longer than the center wavelength of the light transmitted through the second filter 240. That is, the second filter 240 may transmit the light L1 having the first wavelength band and reflect the light L2 having the second wavelength band and the light L3 having the third wavelength band, wherein the center wavelength of the light L2 having the second wavelength band and the center wavelength of the light L3 having the third wavelength band are longer than the center wavelength of the light L1 having the first wavelength band. Therefore, the second filter 240 may transmit blue light and reflect red light and green light.

The second filter 240 may reflect the light L2 having the second wavelength band, which is emitted from the first wavelength conversion pattern WC1 toward the lower substrate 110, back toward the upper substrate 210, thereby improving the light output efficiency. In addition, the second filter 240 may transmit the light L1 having the first wavelength band provided from the backlight unit 20 but reflect light whose center wavelength is longer than that of the light L1 having the first wavelength band. Therefore, the color purity of the light L1 having the first wavelength band provided from the backlight unit 20 can be improved. The path of light provided to the second filter 240 will be described in more detail later with reference to FIG. 5.

The light transmission patterns TC will now be described. The light transmission patterns TC may be disposed on the second filter 240. The light transmission patterns TC may transmit light incident from the outside without changing the color of the light.

More specifically, the light transmission patterns TC may include the first light transmission pattern TC1 and the second light transmission pattern TC2.

The first light transmission pattern TC1 may be disposed on the second filter 240 and may overlap the third subpixel electrode SPE3 in the direction perpendicular to the lower substrate 110. The second light transmission pattern TC2 may be disposed on the second filter 240 and may be located between the first wavelength conversion pattern WC1 and the second wavelength conversion pattern WC2. That is, the second light transmission pattern TC2 overlaps the first wavelength conversion pattern WC1 and the second wavelength conversion pattern WC2 in the direction horizontal to the lower substrate 110.

More specifically, the first light transmission pattern TC1 may receive the light L1 having the first wavelength band from the backlight unit 20 and transmit the light L1 as it is without converting or shifting the center wavelength of the light L1. The first light transmission pattern TC1 may not overlap the first filter 220. The first light transmission pattern TC1 may include the light scattering material TC1a and a third light transmitting resin TC1b.

The light scattering material TC1a may be dispersed in the third light transmitting resin TC1b to scatter light provided to the first light transmitting pattern TC1 and emit the scattered light to the outside. More specifically, the first light transmission pattern TC1 may scatter the light L1 having the first wavelength band received from the backlight unit 20 and emit the scattered light L1 to the outside. That is, the first light transmission pattern TC1 may receive blue light and transmit the blue light as it is.

The light scattering material TC1a may scatter incident light in various directions regardless of the incident angle and emit the scattered light. Here, the emitted light may be in the unpolarized state through depolarization. That is, the light scattering material TC1a may scatter the light L1 having the first wavelength band, which is received from the backlight unit 20, in various directions regardless of the incident angle without converting the center wavelength of the light L1. Accordingly, the lateral visibility of the display device 1 according to the embodiment can be improved.

The light scattering material TC1a may be a material having a different refractive index from the third light transmitting resin TC1b in an embodiment. In addition, the light scattering material TC1a is not particularly limited as long as it can scatter incident light. For example, the light scattering material TC1a may be a metal oxide or organic particles. The metal oxide may include titanium oxide ($TiO_2$), zirconium oxide ($ZrO_2$), aluminum oxide ($Al_2O_3$), indium oxide ($In_2O_3$), zinc oxide (ZnO), or tin oxide ($SnO_2$). The organic material may include acrylic resin or urethane resin.

The third light transmitting resin TC1b may be a transparent light transmitting resin in an embodiment. The third light transmitting resin TC1b may be made of the same or different material from the first light transmitting resin WC1b and the second light transmitting resin WC2b.

The second light transmission pattern TC2 may be formed in the same process as the first light transmission pattern TC1. In an embodiment, the second light transmission pattern TC2 may be formed at the same time as the first light transmission pattern TC1 using the same mask. Accordingly, the second light transmission pattern TC2 may include the same material as the first light transmission pattern TC1.

Since the second light transmission pattern TC2 is located between the first wavelength conversion pattern WC1 and the second wavelength conversion pattern WC2, the height of a valley step formed between the first wavelength conversion pattern WC1 and the second wavelength conversion pattern WC2 can be minimized. Accordingly, the flatness of the planarization layer 260 to be described later can be improved. This will be described later with reference to FIGS. 6 and 7.

The second low refractive layer 250 may be disposed on the light transmission patterns TC and the second filter 240. The second low refractive layer 250 may be disposed on the entire surfaces of the light transmission patterns TC and the second filter 240 in an embodiment. Accordingly, the second low refractive layer 250 may overlap each of the first wavelength conversion pattern WC1, the second wavelength conversion pattern WC2, the first light transmission pattern TC1, and the second light transmission pattern TC2 in the direction perpendicular to the lower substrate 110.

The second low refractive layer 250 may not be in contact with the first wavelength conversion pattern WC1 and the second wavelength conversion pattern WC2. On the other hand, the second low refractive layer 250 may be in contact with the first light transmission pattern TC1 and the second light transmission pattern TC2. That is, unlike the first low refractive layer 230, the second low refractive layer 250 may not contact the first wavelength conversion pattern WC1 and the second wavelength conversion pattern WC2 but may contact the first light transmission pattern TC1 and the second light transmission pattern TC2.

The refractive index of the second low refractive layer 250 is not particularly limited as long as it is lower than the refractive indices of the wavelength conversion patterns WC. For example, the second low refractive layer 250 may have a refractive index of about 1.1 to 1.4. In addition, the refractive index of the first low refractive layer 230 and the refractive index of the second low refractive layer 250 can be equal to or different from each other as long as they are lower than the refractive indices of the wavelength conversion patterns WC.

Of light emitted from the wavelength conversion patterns WC, light emitted toward the lower substrate 110 may be reflected back toward the wavelength conversion patterns WC by the second low refractive layer 250. That is, the second low refractive layer 250 can improve the light output efficiency by recycling at least a portion of the light emitted from the wavelength conversion patterns WC.

The second low refractive layer 250 may include a resin and nano particles (such as zinc oxide (ZnO) or titanium dioxide ($TiO_2$)) dispersed in the resin. However, the material of the second low refractive layer 250 is not particularly limited as long as the refractive index of the second low refractive layer 250 is lower than those of the wavelength conversion patterns WC. In an embodiment, the second low refractive layer 250 may include one of hollow silica, nano silicate, and porogen. In an embodiment, the materials of the first low refractive layer 230 and the second low refractive layer 250 may be the same. In an embodiment, the materials of the first low refractive layer 230 and the second low refractive layer 250 may be different from each other.

Referring again to FIG. 1, the planarization layer 260 may be disposed on the second low refractive layer 250. The planarization layer 260 may provide flatness to the second polarizing layer 280 which will be described later. That is, when the first wavelength conversion pattern WC1, the second wavelength conversion pattern WC2, the first light transmission pattern TC1 and the second light transmission pattern TC2 are formed to different thicknesses in a process, the planarization layer 260 may make the heights of the above elements uniform.

The material of the planarization layer 260 is not particularly limited as long as it has planarization characteristics. In an embodiment, the planarization layer 260 may include an organic material. For example, the organic material may include cardo resin, polyimide resin, acrylic resin, siloxane resin, or silsesquioxane resin.

The second insulating layer 270 may be disposed on the planarization layer 260. The second insulating layer 270 may consist of at least one layer having an insulating inorganic material. The insulating inorganic material may include silicon nitride or silicon oxide in an embodiment. The second insulating layer 270 can prevent the planarization layer 260 from being damaged in the process of forming the second polarizing layer 280 which will be described later. In addition, the second insulating layer 270 can improve the adhesion of the second polarizing layer 280 and can prevent the second polarizing layer 280 from being corroded or damaged by air or moisture. The second insulating layer 270 can be omitted.

The second polarizing layer 280 may be disposed on the second insulating layer 270. The second polarizing layer 280 may be a wire grid polarizer in an embodiment. The second polarizing layer 280 will hereinafter be described as a wire grid polarizer.

The second polarizing layer 280 may include a plurality of wire grid patterns. In an embodiment, the wire grid patterns may include a conductive material through which a current flows. Here, the conductive material may include a metal such as aluminum (Al), silver (Ag), gold (Au), copper (Cu), or nickel (Ni) in an embodiment. In addition, the conductive material may further include titanium (Ti) or molybdenum (Mo). In an embodiment, the wire grid patterns may be a stacked structure of at least two pattern layers.

For example, when light provided to the second polarizing layer 280 passes through the second polarizing layer 280, components parallel to the second polarizing layer 280 may be absorbed or reflected, and components perpendicular to the second polarizing layer 280 may be transmitted to form polarized light. The second polarizing layer 280 may be formed by a method such as nanoimprinting in an embodiment.

A capping layer 281 may be disposed on the second polarizing layer 280. The capping layer 281 may be disposed directly on the wire grid patterns to cover and protect the wire grid patterns. The capping layer 281 can prevent the second polarizing layer 280 from being damaged or corroded by penetration of air or moisture. The capping layer 281 may be made of an inorganic insulating material such as silicon nitride or silicon oxide in an embodiment.

The common electrode CE may be disposed on the capping layer 281. At least part of the common electrode CE may overlap the first through third subpixel electrodes SPE1 through SPE3. The common electrode CE may be in the form of a whole plate in an embodiment. In addition, the common electrode CE may include a plurality of slits. The common electrode CE may be a transparent electrode or a translucent electrode or may be made of a reflective metal such as aluminum, silver, chromium or an alloy of these materials. Here, the transparent electrode or the translucent electrode may include one or more of indium tin oxide (ITO), indium zinc oxide (IZO), zinc oxide (ZnO), indium oxide ($In_2O_3$), indium gallium oxide (IGO), and aluminum zinc oxide (AZO).

The upper alignment film 290 may be disposed on the common electrode CE. The upper alignment film 290 may induce the initial alignment of the liquid crystal molecules 310 in the liquid crystal layer 300. The upper alignment film 290 may include a polymer organic material having an imide group in a repeating unit of a main chain in an embodiment.

Next, the liquid crystal layer 300 will be described. The liquid crystal layer 300 includes a plurality of initially aligned liquid crystal molecules 310. The liquid crystal molecules 310 may have negative dielectric anisotropy and may be vertically aligned in the initial alignment state. The liquid crystal molecules 310 may have a predetermined pretilt angle in the initial alignment state. The initial alignment of the liquid crystal molecules 310 can be induced by the lower alignment film 140 and the upper alignment film 290. When an electric field is formed between the lower display panel 100 and the upper display panel 200, the liquid crystal molecules 310 may be tilted or rotated in a specific direction to change the polarization state of light transmitted through the liquid crystal layer 300.

Figure 4A:
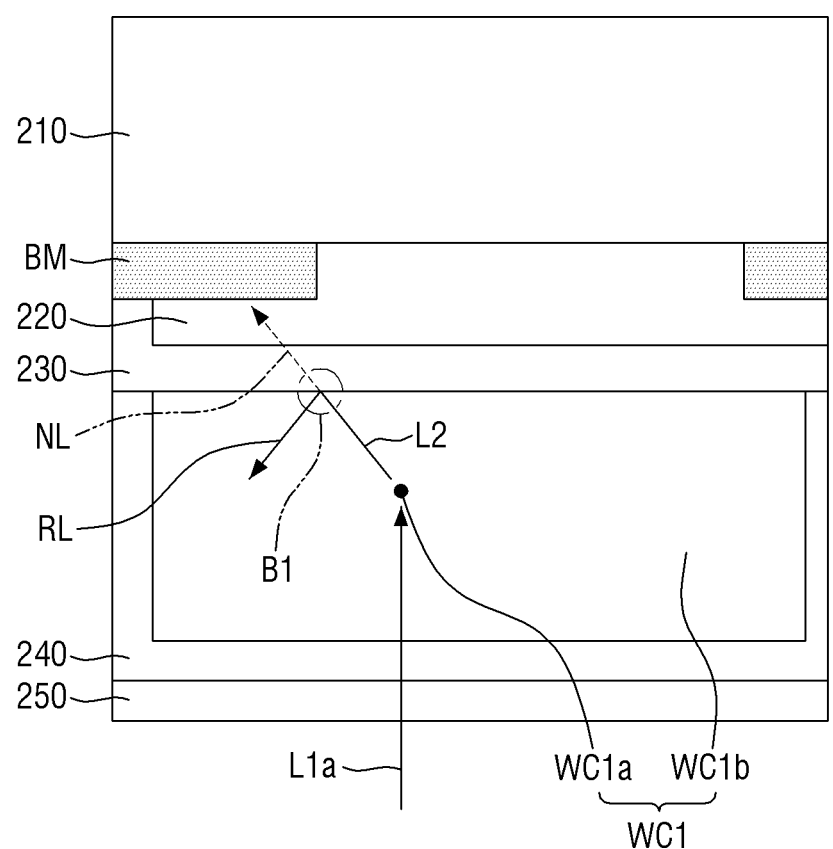
FIGS. 4A through 5B illustrate optical paths in the display device according to the embodiment.

The path of light provided from the backlight unit 20 will now be described based on the first wavelength conversion pattern WC1 by referring to FIGS. 3 through 5. FIGS. 4A through 5B illustrate optical paths in the display device 1 according to the embodiment. For ease of description, different paths of the light L1 having the first wavelength band and different paths of the light L2 having the second wavelength band are indicated by different reference numerals in FIGS. 4 and 5.

The path of light emitted toward the upper substrate 210 will first be described again with reference to FIG. 3.

As described above, the light L1 having the first wavelength band is provided to the second filter 240 that covers the first wavelength conversion pattern WC1. The second filter 240 provides the received light L1 having the first wavelength band to the first wavelength conversion pattern WC1 by transmitting the light L1. The first wavelength conversion material WC1a of the first wavelength conversion pattern WC1 converts the light L1 having the first wavelength band into the light L2 having the second wavelength band by shifting the center wavelength of the light L1. The light L2 having the second wavelength band is emitted toward the outside, that is, toward the upper substrate 210.

Hereinafter, the path of light that fails to be emitted toward the upper substrate 210 will be described with reference to FIGS. 4 and 5.

Referring to FIG. 4A, light L1a having the first wavelength band is converted into the light L2 having the second wavelength band by the first wavelength conversion material WC1a of the first wavelength converting pattern WC1. However, when the light L2 having the second wavelength band is emitted toward the upper substrate 210, it can be provided to the black matrix BM and absorbed by the black matrix BM without being emitted out of the upper display panel 200. This light is defined as ineffective light NL that does not affect luminance. The ineffective light NL may be a factor that reduces the light output efficiency.

In addition, although not illustrated in the drawing, the light L2 having the second wavelength band can be totally reflected due to the difference between the refractive index of the upper substrate 210 and the refractive index of outside air. Accordingly, the light L2 having the second wavelength band can be incident on the wavelength conversion patterns WC or the light transmission patterns TC of another pixel. The light incident on another pixel is defined as noise light. The noise light can reduce color purity and cause deterioration of image quality.

The display device 1 according to the embodiment may include the first low refractive layer 230 disposed between the first wavelength conversion pattern WC1 and the upper substrate 210. The first low refractive layer 230 has a lower refractive index than the first wavelength conversion pattern WC1.

Since the refractive index of the first low refractive layer 230 is lower than that of the first wavelength conversion pattern WC1 as described above, when the incident angle of the light L2 having the second wavelength band illustrated in FIG. 4A is equal to or greater than a total reflection critical angle, the light L2 having the second wavelength band is totally reflected toward the first wavelength conversion pattern WC1 at a first interface B1 between the first low refractive layer 230 and the first wavelength conversion pattern WC1. Accordingly, the light L2 having the second wavelength band is incident toward the first wavelength conversion pattern WC1 again. The light L2 re-incident toward the first wavelength conversion pattern WC1 is defined as recycled light RL.

The recycled light RL can have an opportunity to be emitted toward the upper substrate 210 again by the second filter 240 or the second low refractive layer 250. That is, the first low refractive layer 230 can prevent the light L2 having the second wavelength band from becoming the ineffective light NL or the noise light, thereby improving light output efficiency, color purity, and display quality.

When the incident angle of the light L2 having the second wavelength band illustrated in FIG. 4A is smaller than the total reflection critical angle, the incident angle of light incident from the upper substrate 210 to the outside air is reduced due to the first low refractive layer 230 formed between the first wavelength conversion pattern WC1 and the upper substrate 210 (in a case where the refractive index of the upper substrate 210 is higher than that of the first low refractive layer 230). Accordingly, the total reflection ratio of the light incident from the upper substrate 210 to the outside air is reduced, and the light incident from the upper substrate 210 to the outside air can be concentrated close to a direction perpendicular to the upper substrate 210.

If the light incident from the upper substrate 210 to the outside air is incident again on the upper display panel 200 through total reflection, the re-incident light may be absorbed by the black matrix BM to become the ineffective light NL or may be provided to another pixel to become the noise light. This causes a reduction in the light output efficiency and display quality of the display device 1.

However, since the display device 1 according to the embodiment includes the first low refractive layer 230 between the upper substrate 210 and the first wavelength conversion pattern WC1, the total reflection ratio of the light incident from the upper substrate 210 to the outside air can be reduced, which, in turn, improves the light output efficiency and the display quality.

Figure 4B:
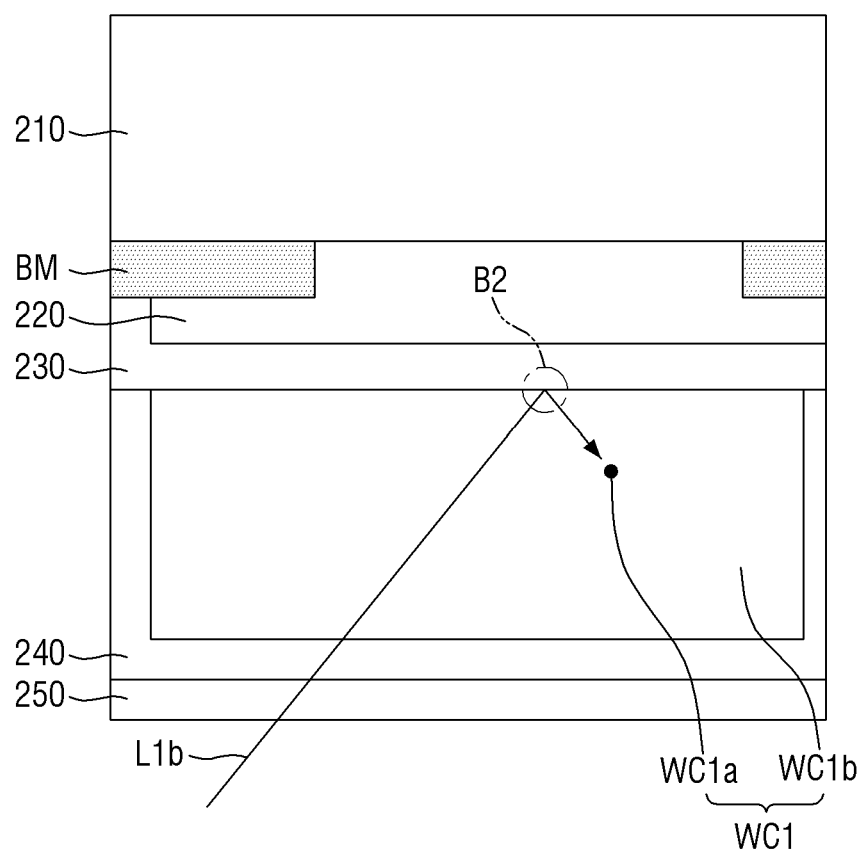

Referring to FIG. 4B, light L1b having the first wavelength band does not contact the first wavelength conversion material WC1a of the first wavelength conversion pattern WC1. Therefore, the center wavelength of the light L1b having the first wavelength band may not be converted. As described above, the refractive index of the first low refractive layer 230 is lower than that of the first wavelength conversion pattern WC1. Therefore, when the incident angle of the light L1b which has the first wavelength band and whose center wavelength has not been converted is equal to or greater than the total reflection critical angle, the first low refractive layer 230 may totally reflect the light L1b, which has the first wavelength band and whose center wavelength has not been converted, into the first wavelength conversion pattern WC1 at a second interface B2.

Accordingly, the totally reflected light L1b has an opportunity to contact the first wavelength conversion material WC1a within the first wavelength conversion pattern WC1. That is, the first low refractive layer 230 totally reflects the light L1b, which has the first wavelength band and whose center wavelength has not been converted, back into the first wavelength conversion pattern WC1 in order to give an opportunity for the center wavelength of the light L1b to be converted. As a result, the light output efficiency can be improved.

Figure 4C:
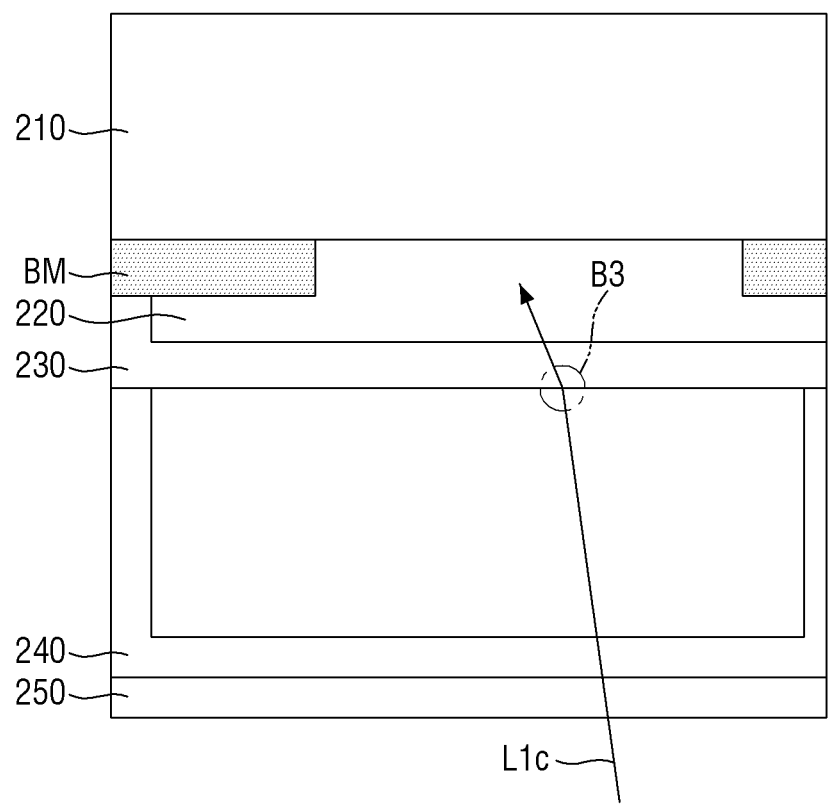

Next, referring to FIG. 4C, light L1c having the first wavelength band does not contact the first wavelength conversion material WC1a of the first wavelength conversion pattern WC1. Therefore, the center wavelength of the light L1c having the first wavelength band may not be converted. Further, when the incident angle of the light L1c having the first wavelength band is smaller than the total reflection critical angle, the light L1c may not be totally reflected at a third interface B3 between the first low refractive layer 230 and the first wavelength conversion pattern WC1. In this case, the light L1c having the first wavelength band may be provided to the first filter 220.

The first filter 220 may block (filter) the light L1c, which has the first wavelength band and whose center wavelength has not been converted, from being emitted to the outside of the upper substrate 210. That is, the first filter 220 can prevent the light L2 having the second wavelength band and the light L1 having the first wavelength band, which display different colors, from being mixed with each other, thereby improving color purity.

While a case where the first filter 220 blocks the light L1 having the first wavelength band has been described above, the wavelength band blocked by the first filter 220 can vary according to the wavelength band of light emitted from the backlight unit 20.

Next, the path of light emitted from the first wavelength conversion pattern WC1 toward the lower substrate 110 will be described with reference to FIG. 5.

Figure 5A:
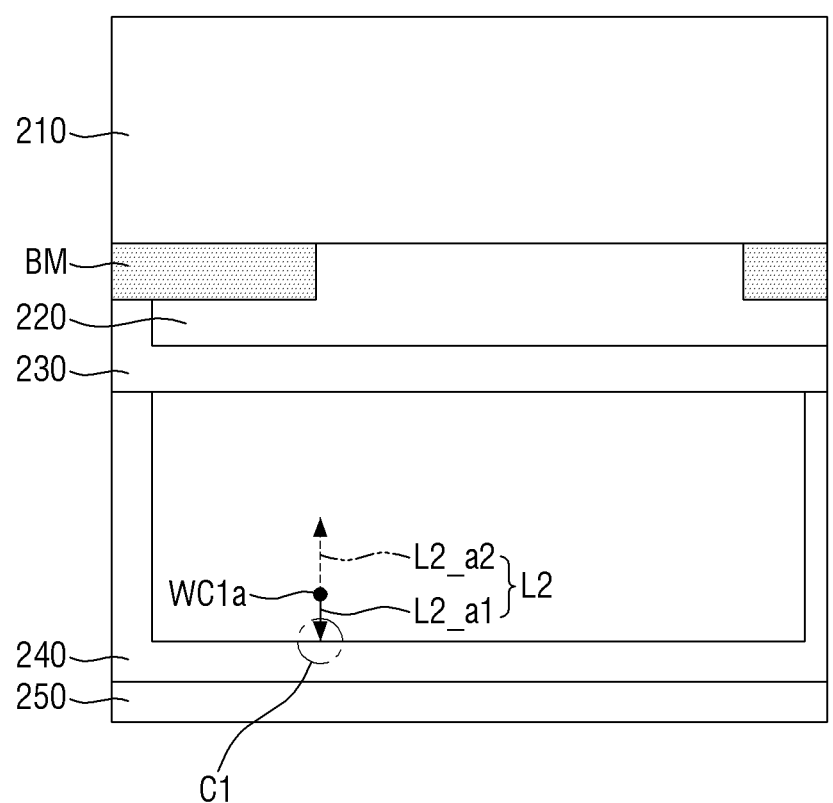
Figure 5B:
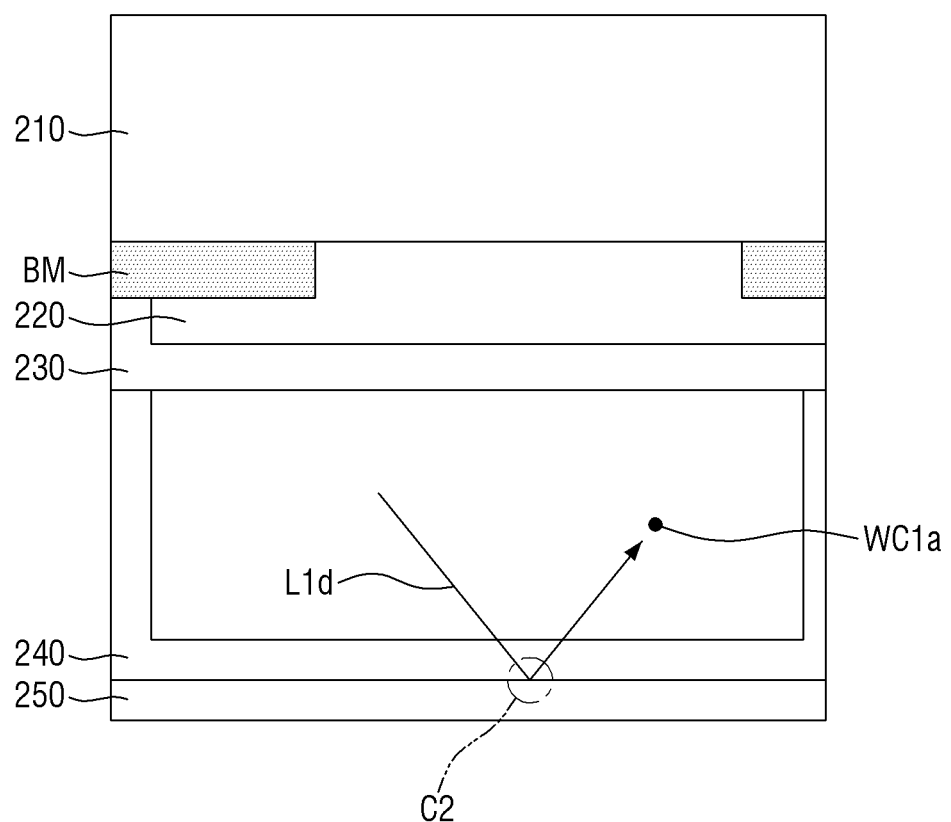

Referring to FIG. 5A, some L2_a1 of the light L2 having the second wavelength band may travel toward the lower substrate 110 without being emitted toward the upper substrate 210. As described above, the second filter 240 may transmit the light L1 having the first wavelength band and reflect the light L2 having the second wavelength band and the light L3 having the third wavelength band, wherein the center wavelength of the light L2 having the second wavelength band and the center wavelength of the light L3 having the third wavelength band are longer than the center wavelength of the light L1 having the first wavelength band. In an embodiment, the second filter 240 may be a dichroic filter.

Therefore, the second filter 240 may reflect the light L2_a1 having the second wavelength band back to the upper substrate 210 at a first interface C1 between the first wavelength conversion pattern WC1 and the second filter 240. The light L2_a2 reflected by the second filter 240 may enter the first wavelength conversion pattern WC1 and have an opportunity to be emitted toward the upper substrate 210.

While a case where the second filter 240 transmits the light L1 having the first wavelength band and reflects light having a wavelength band whose center wavelength is longer than the center wavelength of the light L1 has been described above, the center wavelength band reflected by the second filter 240 can vary according to the wavelength band of light emitted from the backlight unit 20.

Referring to FIG. 5B, when the incident angle of light L1d having the first wavelength band and not contacting the first wavelength conversion material WC1a is equal to or greater than the total reflection critical angle, the light L1d may be reflected by the second low refractive layer 250 back to the first wavelength conversion pattern WC1. Thus, the light L1d incident on the first wavelength conversion pattern WC1 can have an opportunity to contact the first wavelength conversion material WC1a within the first wavelength conversion pattern WC1 and an opportunity to be output again toward the upper substrate 210.

Here, the light L1d having the first wavelength band illustrated in FIG. 5B may be, for example, the light L1b input to the first wavelength conversion pattern WC1 by the total reflection at the second interface B2 between the first wavelength conversion pattern WC1 and the first low refractive layer 320 in FIG. 4B.

Since the second filter 240 transmits the light L1 having the first wavelength band as described above, the light L1d having the first wavelength band may be transmitted through the second filter 240 and provided to the second low refractive layer 250. The refractive index of the second low refractive layer 250 is smaller than that of the first wavelength conversion pattern WC1.

Therefore, when the incident angle of the light L1d having the first wavelength band and travelling toward the second low refractive layer 250 is equal to or greater than the total reflection critical angle, the light L1d having the first wavelength band may be totally reflected back into the first wavelength conversion pattern WC1 at an interface C2 between the second filter 240 and the second low refractive layer 250. The light L1d incident on the first wavelength conversion pattern WC1 has an opportunity to contact the first wavelength conversion material WC1a within the first wavelength conversion pattern WC1 and an opportunity to be output toward the upper substrate 210 again.

That is, the second low refractive layer 250 totally reflects the light L1d, which has the first wavelength band and whose center wavelength has not been converted, back into the first wavelength conversion pattern WC1, thereby providing an opportunity for the center wavelength of the light L1d to be converted. As a result, the light output efficiency can be improved.

Although not illustrated in the drawing, of the light L2 which has the second wavelength band and whose center wavelength has been converted by the first wavelength conversion material WC1a, a portion of light directed toward the lower substrate 110 may travel toward the second refractive layer 250 without being reflected by the second filter 240. In this case, the second low refractive layer 250 may totally reflect the received light L2 having the second wavelength band back into the first wavelength conversion pattern WC1. That is, since the light L2 having the second wavelength band is given an opportunity to be emitted toward the upper substrate 210 again, the light output efficiency can be improved.

Next, the flatness of the planarization layer 260 will be described in more detail with reference to FIGS. 6A and 6B and 7.

Figure 6A:
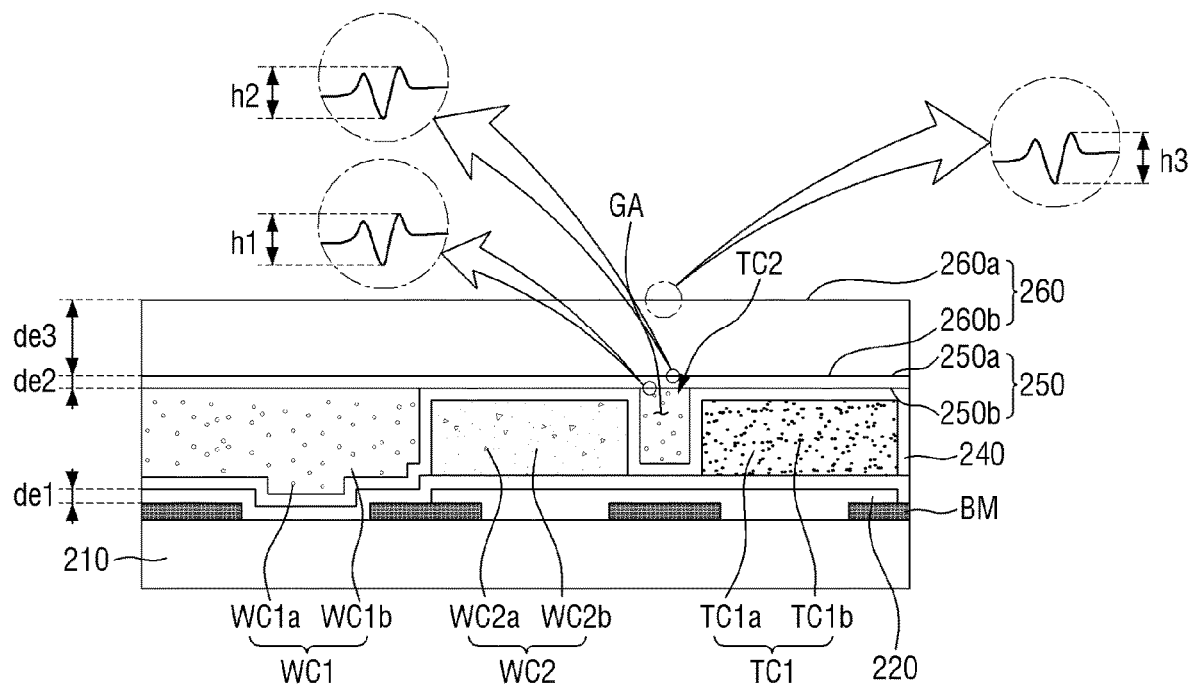
FIG. 6A illustrates the area A of FIG. 1 turned over.

FIG. 6A illustrates the area A of FIG. 1 turned over. FIG. 6B illustrates the area A of FIG. 1 turned over in a case where the second light transmission pattern TC2 is omitted. FIG. 7 illustrates the flatness of the planarization layer 260 among the elements of the display device 1 according to the embodiment.

Referring to FIG. 6A, the planarization layer 260 includes a first surface 260a which contacts the second insulating layer 270 (see FIG. 1) and a second surface 260b which contacts the second low refractive layer 250. The second low refractive layer 250 includes a first surface 250a which contacts the second surface 260b of the planarization layer 260 and a second surface 250b which is opposite the first surface 250a.

The second light transmission pattern TC2 is disposed in a valley area GA between the first wavelength conversion pattern WC1 and the second wavelength conversion pattern WC2. Thus, the second light transmission pattern TC2 can provide flatness to the second low refractive layer 250. That is, the second light transmission pattern TC2 is formed to fill the valley area GA between the first wavelength conversion pattern WC1 and the second wavelength conversion pattern WC2, thereby minimizing a step height h1 of the second surface 250b of the second low refractive layer 250. As the step height h1 of the second surface 250b of the second low refractive layer 250 is minimized, a step height h2 of the first surface 250a of the second low refractive layer 250 may also be minimized. Here, the step height of a specific surface refers to a height difference between a lowest part and a highest part of the specific surface.

As the step heights h2 and h1 of the first surface 250a and the second surface 250b of the second low refractive layer 250 are minimized, the thickness of the second low refractive layer 250 for step height compensation may also be reduced. In an embodiment, the second low refractive layer 250 may be formed to a thickness de2 of about 1 µm or less. The reduction in the thickness de2 of the second low refractive layer 250 can reduce the cost of forming the second low refractive layer 250 and reduce the occurrence of cracks.

Furthermore, when the step height h2 of the first surface 250a of the second low refractive layer 250 is minimized, the step height of the first surface 260a of the planarization layer 260 disposed on the second low refractive layer 250 may also be minimized. In an embodiment, the first surface 260a of the planarization layer 260 may have a step height h3 of about 0 to 40 nm. Thus, the flatness of the planarization layer 260 can be sufficiently secured. In addition, as the step height of the planarization layer 260 is minimized, a thickness de3 of the planarization layer 260 necessary for step height compensation may also be reduced. In an embodiment, the thickness de3 of the planarization layer 260 may be about 2 to 3 µm. The reduction in the thickness de3 of the planarization layer 260 can reduce the cost of forming the planarization layer 260 and prevent the warpage of the planarization layer 260.

FIG. 6A will be described in more detail through comparison with FIG. 6B. For ease of description, the same reference numerals as those of FIG. 6A will be used in FIG. 6B.

Figure 6B:
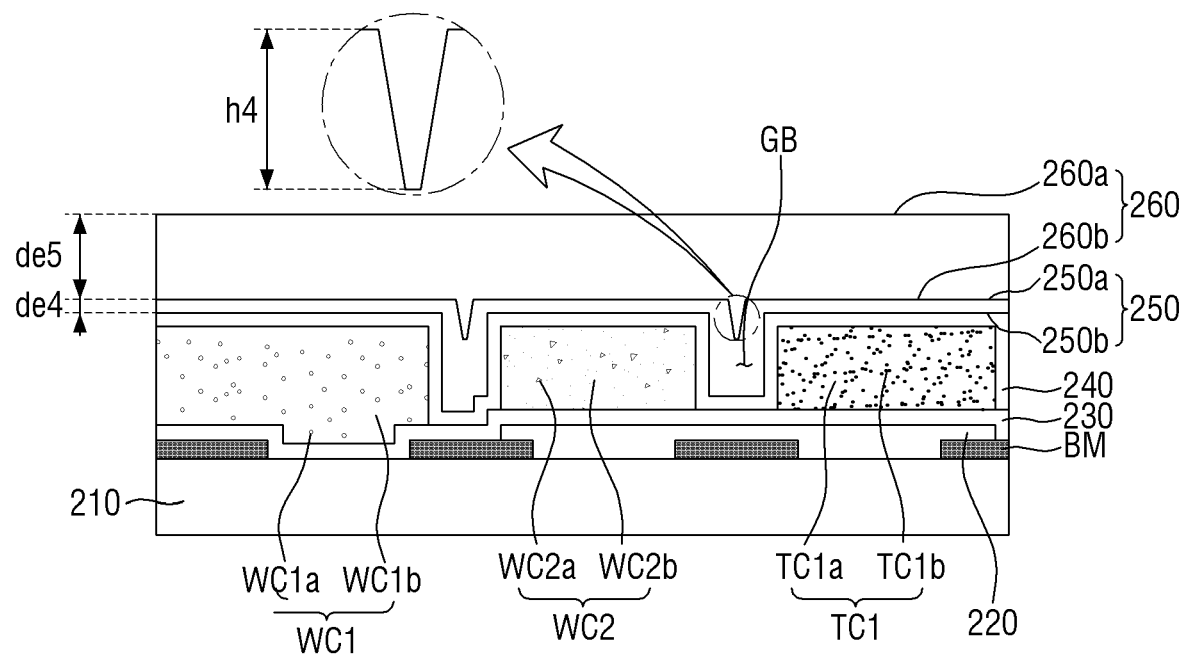
FIG. 6B illustrates the area A of FIG. 1 turned over in a case where a second light transmission pattern is omitted.

When the second light transmission pattern TC2 is absent as illustrated in FIG. 6B, the second low refractive layer 250 is formed to fill the valley area GB between the first wavelength conversion pattern WC1 and the second wavelength conversion pattern WC2. Here, the absence of the second light transmission pattern TC2 denotes that the first light transmission pattern TC1 is disposed under the second filter 240.

Therefore, a step height h4 of the first surface 250a of the second low refractive layer 250 is increased by the height of the valley step. Accordingly, the step height h4 of the first surface 250a of the second low refractive layer 250 illustrated in FIG. 6B is greater than the step height h2 of the first surface 250a of the second low refractive layer 250 illustrated in FIG. 6A. Therefore, in order to compensate for the step height h4, the second low refractive layer 250 illustrated in FIG. 6B should have a large thickness de4. The increase in the thickness de4 of the second low refractive layer 250 causes the occurrence of cracks in the second low refractive layer 250 and an increase in the cost of forming the second low refractive layer 250. In an embodiment, the thickness de4 of the second low refractive layer 250 illustrated in FIG. 6B may be about 3 to 4 µm.

In addition, the step height h4 of the first surface 250a of the second low refractive layer 250 affects the step height h5 of the first surface 260a of the planarization layer 260. Since the planarization layer 260 is formed on the second low refractive layer 250, a thickness de5 of the planarization layer 260 should be large enough to compensate for the step height h4 of the first surface 250a of the second low refractive layer 250. In an embodiment, the thickness de5 of the planarization layer 260 illustrated in FIG. 6B may be about 4 to 6 µm. The increase in the thickness de5 of the planarization layer 260 causes an increase in the overall thickness of the upper display panel 200 and the warpage of the planarization layer 260.

That is, the display device 1 according to the embodiment can provide flatness to the second low refractive layer 250 and the planarization layer 260 by including the second light transmission pattern TC2. Therefore, the occurrence of cracks in the second low refractive layer 250 and the warpage of the planarization layer 260 can be prevented. Furthermore, the cost of forming the second low refractive layer 250 and the planarization layer 260 can be reduced.

A thickness de1 of the first low refractive layer 230 illustrated in FIG. 6A is not particularly limited. However, in an embodiment, the thickness de1 of the first low refractive layer 230 may be set to about 1 µm or less in consideration of crack occurrence and cost. That is, the thickness de1 of the first low refractive layer 230 may be the same as the thickness de2 of the second low refractive layer 250. However, the inventive concept is not limited to this case, and the thickness de1 of the first low refractive layer 230 can also be different from the thickness de2 of the second low refractive layer 250.

Figure 7:
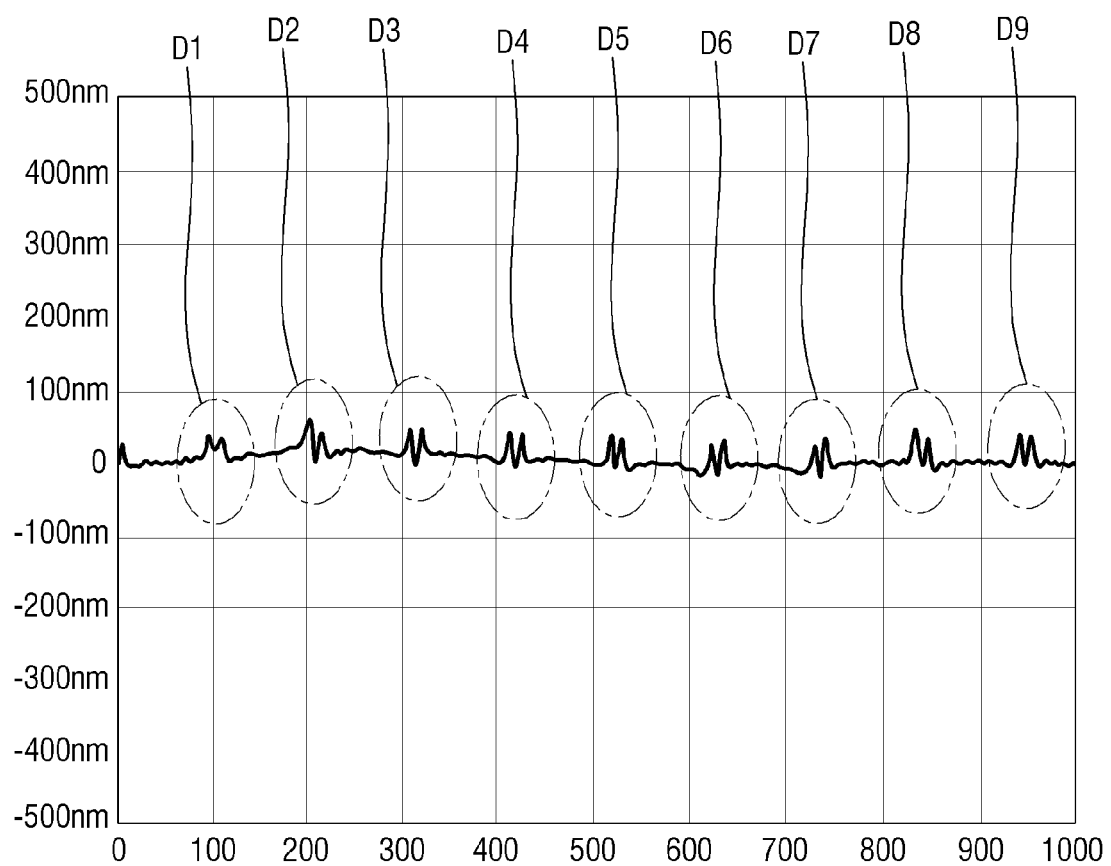
FIG. 7 illustrates the flatness of a surface of a planarization layer among elements of the display device according to the embodiment.

FIG. 7 illustrates the flatness of the first surface 260a of the planarization layer 260 among the elements of the display device 1 according to the embodiment.

Referring to FIG. 7, the first surface 260a of the planarization layer 260 may have different step heights at different positions D1 through D9 in consideration of process conditions and the positional relationship with other elements. However, since the display device 1 according to the embodiment includes the second light transmission pattern TC2 located between the first wavelength conversion pattern WC1 and the second wavelength conversion pattern WC2, the step heights of the first surface 260a of the planarization layer 260 can be minimized. In an embodiment, the step heights at the positions D1 through D9 on the first surface 260a of the planarization layer 260 may all be in the range of 0 to 40 nm.

The color mixing reducing effect of the display device 1 according to the embodiment will now be described with reference to FIG. 8.

As described above, the display device 1 according to the embodiment includes the first low refractive layer 230 to prevent light emitted toward the upper substrate 210 from being totally reflected to an adjacent pixel. Therefore, color mixing can be prevented.

The color mixing can also be suppressed by the second light transmission pattern TC2.

Figure 8:
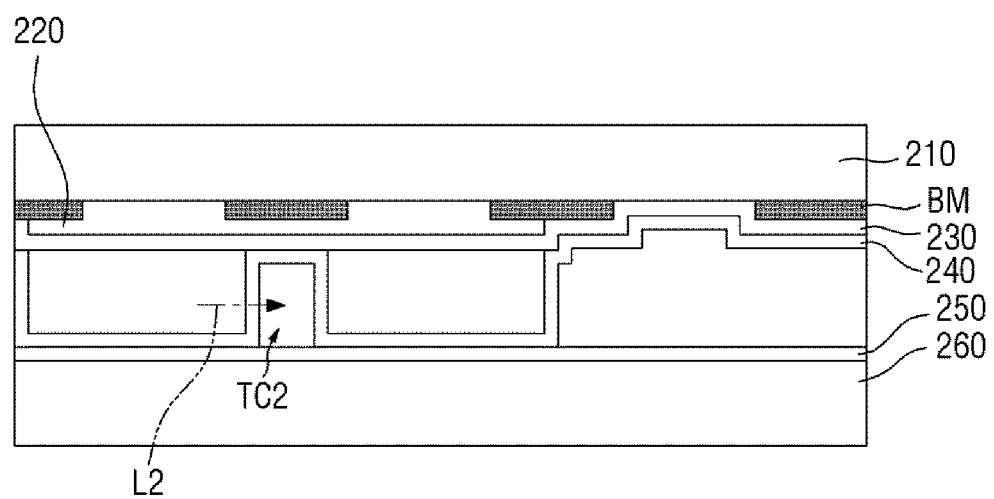
FIG. 8 is a view for explaining the color mixing reducing effect of the display device according to the embodiment.

FIG. 8 is a view for explaining the color mixing reducing effect of the display device 1 according to the embodiment.

Referring to FIG. 8, the display device 1 according to the embodiment includes the second light transmission pattern TC2 disposed between the first wavelength conversion pattern WC1 and the second wavelength conversion pattern WC2. The light L2 having the second wavelength band scattered by the first wavelength conversion pattern WC1 may not enter an adjacent wavelength conversion pattern or an adjacent light transmission pattern due to the second filter 240. In some cases, however, the light L2 having the second wavelength band scattered by the first wavelength conversion pattern WC1 can transmit through the second filter 240 to enter the adjacent second wavelength conversion pattern WC2.

Here, the second light transmission pattern TC2 disposed between the first wavelength conversion pattern WC1 and the second wavelength conversion pattern WC2 in the display device 1 according to the embodiment may block the light L2 having the second wavelength band scattered by the first wavelength conversion pattern WC1 from entering the second wavelength conversion pattern WC2. Thus, color mixing can be prevented.

The prevention of the color mixing can improve color reproducibility. This will now be described with reference to Table 1 below. Table 1 compares the luminance of a conventional display device with the color reproducibility of the display device 1 according to the embodiment. The color reproducibility comparison is based on Commission Internationale de L'eclairage (CIE) 1931 and CIE 1976 established by the CIE. The conventional display device in Table 1 refers to a display device without the second light transmission pattern TC2 among display devices displaying quantum dots.

Referring to Table 1, the color reproducibility of the display device 1 according to the embodiment is better than that of the conventional display device by about 2.6%.

TABLE 1

| Category | | Conventional Display Device | Inventive Display Device |
|---|---|---|---|
| DCI | 1931 | 90.3 | 92.9 |
| | 1976 | 94.8 | 96.1 |

Next, the optical characteristic effect of the display device 1 according to the embodiment will be described with reference to Table 2 below. Table 2 compares the luminance of a conventional display device with the luminance of the display device 1 according to the embodiment. The conventional display device in Table 2 refers to a display device without a low refractive layer among display devices displaying quantum dots.

TABLE 2

| Category | Conventional Display Device | Inventive Display Device |
|---|---|---|
| Luminance (nit) | 120 | 212 |
| Color difference 0 degrees/60 degrees | Δx 0.010, Δy 0.018 | Δx 0.010, Δy 0.020 |

Referring to Table 2, the luminance of the display device 1 according to the embodiment is higher than the luminance of the conventional display device by 77%. In addition, the display device 1 according to the embodiment has substantially the same color difference as the conventional display device. That is, since the display device 1 according to the embodiment includes the first low refractive layer 230 and the second low refractive layer 250, it can have improved luminance while maintaining the same color difference as the conventional display device.

The luminance characteristics according to the refractive index values of the first low refractive layer 230 and the second low refractive layer 250 included in the display device 1 according to an embodiment will now be described with reference to Tables 3 and 4.

Table 3 below shows the luminance in a case where the first low refractive layer 230 and the second low refractive layer 250 have the same refractive index value.

TABLE 3

| Refractive index | First low refractive layer 230 | 1.4 | 1.3 | 1.2 |
|---|---|---|---|---|
| | Second low refractive layer 250 | 1.4 | 1.3 | 1.2 |
| Average refractive index | | 1.4 | 1.3 | 1.2 |
| Luminance | | 1.32 | 1.52 | 1.77 |

Referring to Table 3, in the case where the first low refractive layer 230 and the second low refractive layer 250 have the same refractive index value, the luminance is highest when the average of the refractive index values of the first low refractive layer 230 and the second low refractive layer 250 is lowest.

Table 4 below shows the luminance in a case where the first low refractive layer 230 and the second low refractive layer 250 have different refractive index values.

TABLE 4

| Refractive index | First low refractive layer 230 | 1.2 | 1.2 | 1.3 |
|---|---|---|---|---|
| | Second low refractive layer 250 | 1.3 | 1.4 | 1.4 |
| Difference in refractive index | | 0.1 | 0.2 | 0.1 |
| Average refractive index | | 1.25 | 1.3 | 1.35 |
| Luminance | | 1.59 | 1.44 | 1.38 |

Referring to Table 4, even in the case where the first and second low refractive layers 230 and 250 have different refractive index values, the luminance is highest when the average of the refractive index values of the first low refractive layer 230 and the second low refractive layer 250 is lowest.

As is apparent from the above, the luminance is more affected by the average of the refractive index values of the first and second low refractive layers 230 and 250 than by the difference between the refractive index values. Accordingly, the display device 1 according to the embodiment can improve the luminance by reducing the average of the refractive index values of the first low refractive layer 230 and the second low refractive layer 250.

FIGS. 9 through 14 illustrate other embodiments of the display device 1 of FIG. 1. For simplicity, a description of elements and features identical to those described above with reference to FIGS. 1 through 8 will be omitted.

Figure 9:
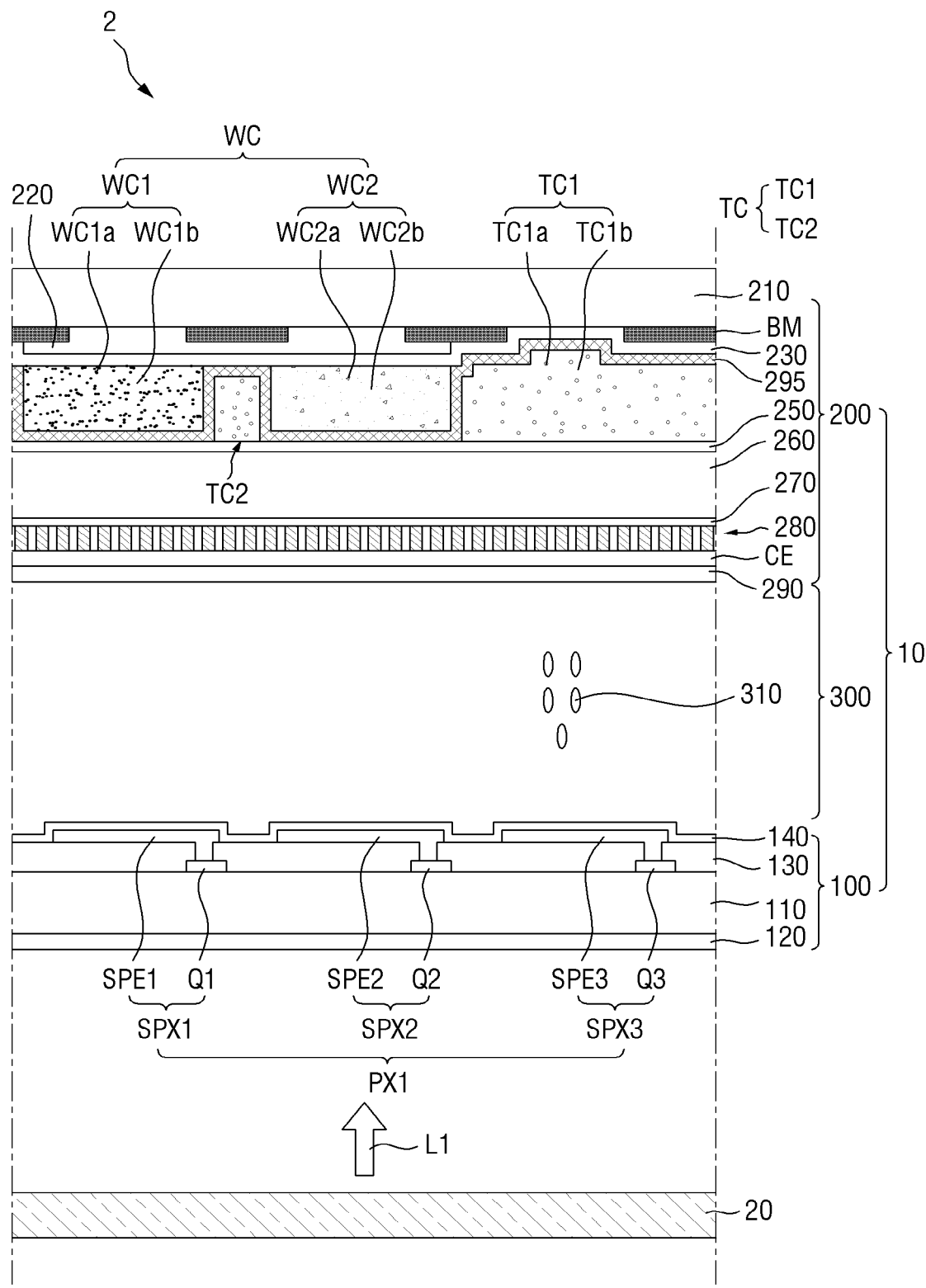
FIGS. 9 through 14 illustrate other embodiments of the display device of FIG. 1.

Referring to FIG. 9, a display device 2 according to an embodiment may not include a second filter 240. That is, the display device 2 of FIG. 9 is different from the display device 1 of FIG. 1 in that it does not include the second filter 240.

However, the display device 2 according to the embodiment may further include third insulating layer 295 in order to prevent a first wavelength conversion pattern WC1, a second wavelength conversion pattern WC2, a first light transmission pattern TC1, and a second light transmission pattern TC2 from directly contacting each other. The third insulating layer 295 may consist of at least one layer including an inorganic material in an embodiment. The inorganic material may include a silicon nitride (SiNx) layer and a silicon oxide (SiOx) layer in an embodiment. The thickness of the third insulating layer 295 is not limited to that illustrated in FIG. 9 as long as the wavelength conversion patterns WC and the light transmission patterns TC do not directly contact each other.

Even if the display device 2 according to the embodiment does not include the second filter 240, the light output efficiency can be maintained because some of the light emitted from the first wavelength conversion pattern WC1 can be input again into the first wavelength conversion pattern WC1 by a second low refractive layer 250.

Figure 10:
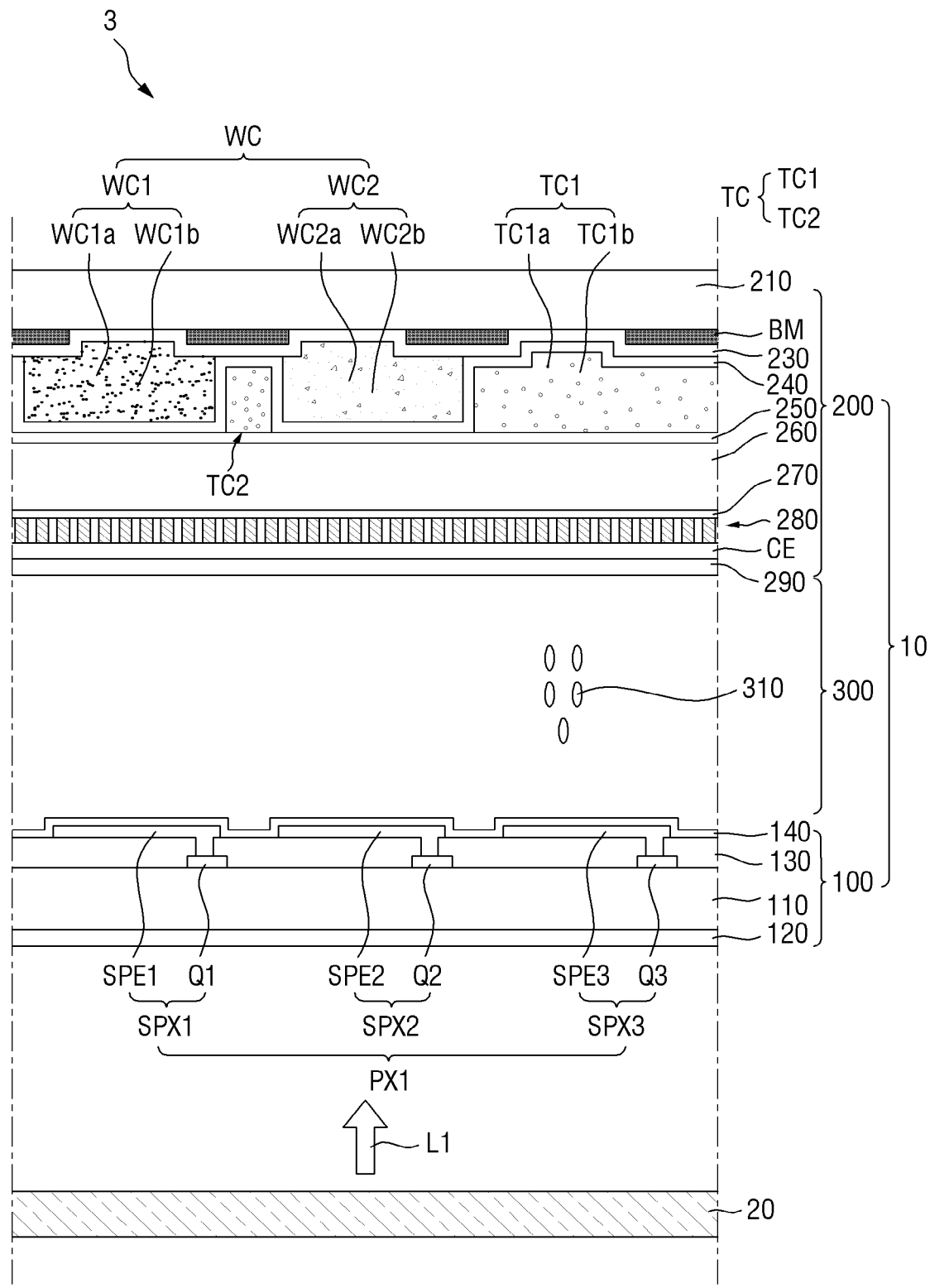

Referring to FIG. 10, a display device 3 according to an embodiment may not include a first filter 220. That is, the display device 3 of FIG. 10 is different from the display device 1 of FIG. 1 in that it does not include the first filter 220.

Even if the display device 3 according to the embodiment does not include the first filter 220, the light output efficiency can be maintained because some of the light emitted from a first wavelength conversion pattern WC1 can be input again into the first wavelength conversion pattern WC1 by a first low refractive layer 230.

Although not illustrated in the drawing, the display device 3 according to the embodiment may also not include both the first filter 220 and a second filter 240.

Figure 11:
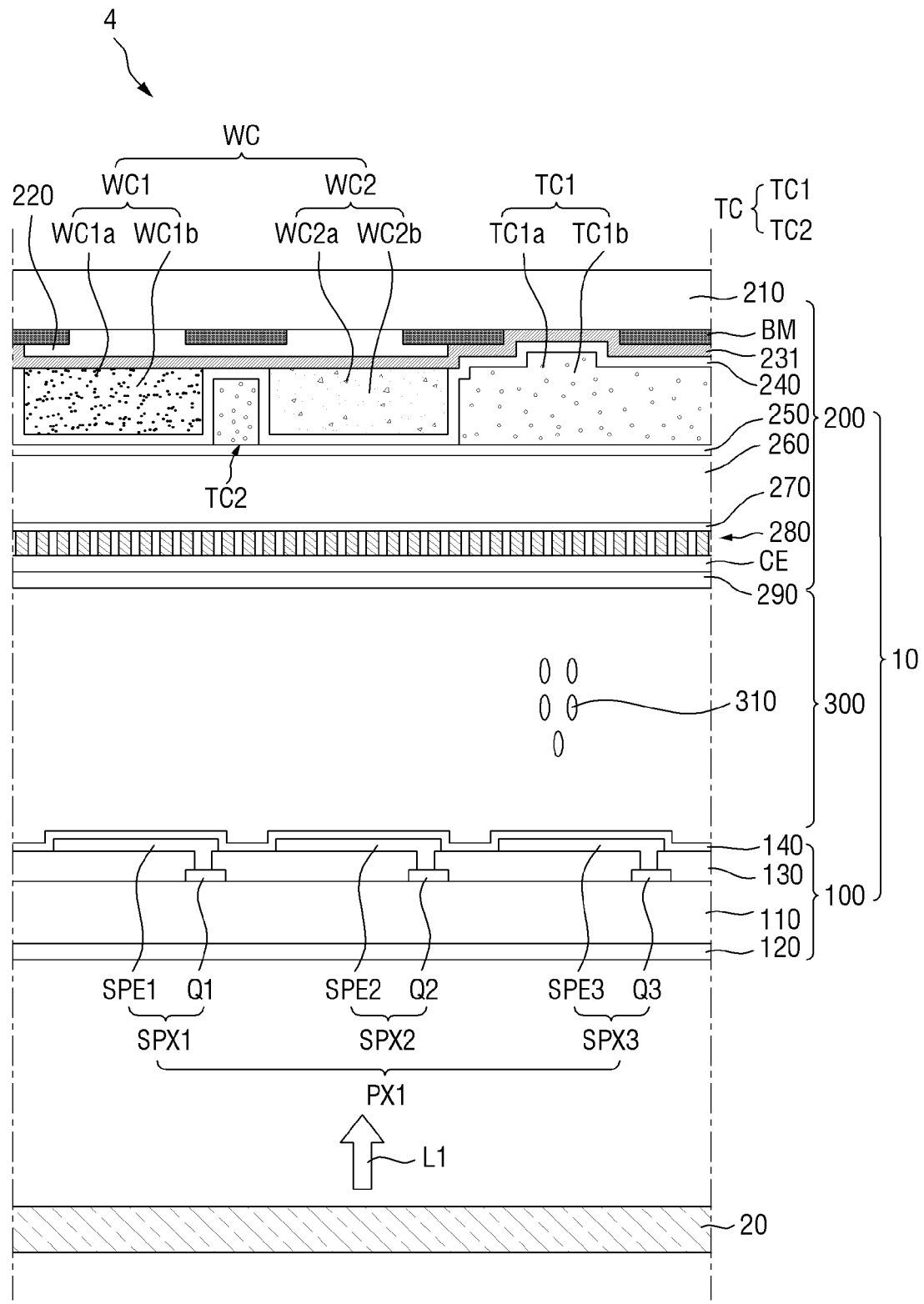

Referring to FIG. 11, a display device 4 according to an embodiment may include a first inorganic layer 231 instead of a first low refractive layer 230. That is, the display device 4 of FIG. 11 is different from the display device 1 of FIG. 1 in that the first low refractive layer 230 is replaced with the first inorganic layer 231.

The first inorganic layer 231 may have a refractive index of about 1.3 to 1.5 in an embodiment. If the refractive index condition is satisfied, the material of the first inorganic layer 231 is not particularly limited. In an embodiment, the first inorganic layer 231 may include a silicon nitride (SiNx) layer or a silicon oxide (SiOx) layer and may be formed as a single layer or may be formed by stacking a plurality of layers.

Figure 12:
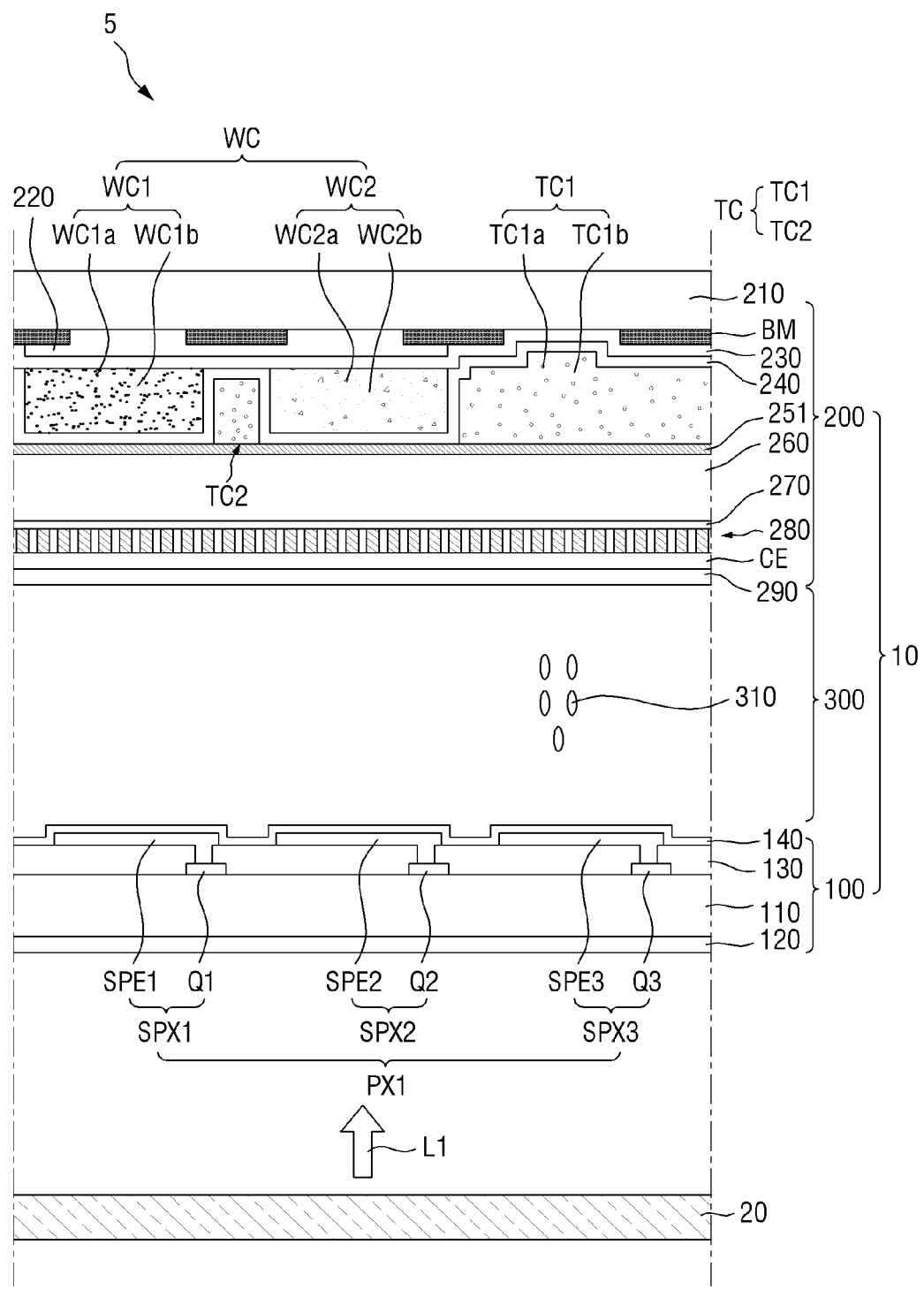

Referring to FIG. 12, a display device 5 according to an embodiment may include a second inorganic layer 251 instead of a second low refractive layer 250. That is, the display device 5 of FIG. 12 is different from the display device 1 of FIG. 1 in that the second low refractive layer 250 is replaced with the second inorganic layer 251.

The second inorganic layer 251 may have a refractive index of about 1.3 to 1.5 in an embodiment. If the refractive index condition is satisfied, the material of the second inorganic layer 251 is not particularly limited. In an embodiment, the second inorganic layer 251 may include a silicon nitride (SiNx) layer or a silicon oxide (SiOx) layer and may be formed as a single layer or may be formed by stacking a plurality of layers.

Although not illustrated in the drawing, both a first low refractive layer 230 and the second low refractive layer 250 can be replaced with a first inorganic layer 231 and the second inorganic layer 251, respectively. Here, the refractive indexes of the first inorganic layer 231 and the second inorganic layer 251 are not necessarily the same, and the materials of the first inorganic layer 231 and the second inorganic layer 251 can be different from each other.

Figure 13:
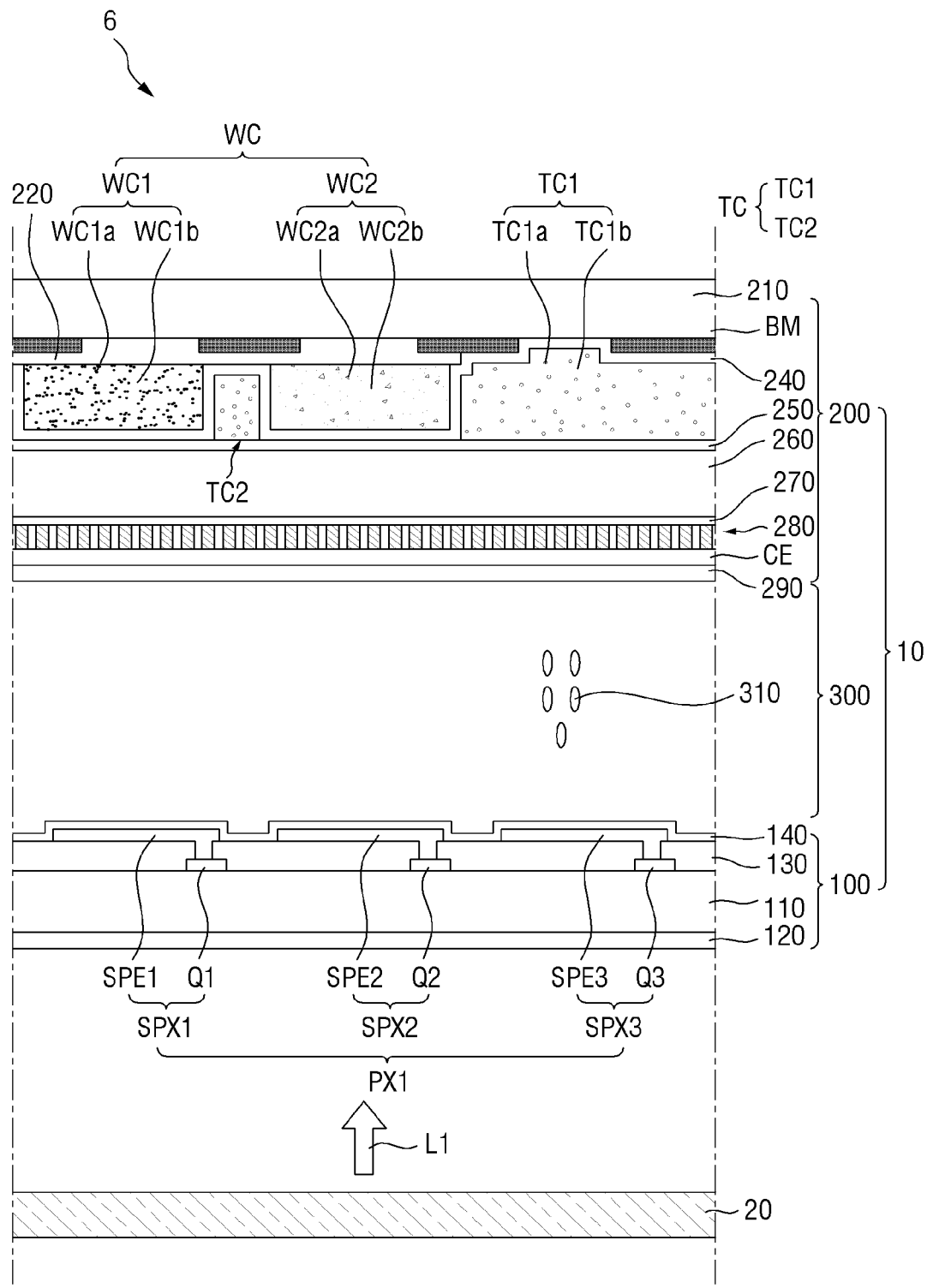

Referring to FIG. 13, a display device 6 according to an embodiment may not include a first low refractive layer 230. That is, the display device 6 of FIG. 13 is different from the display device 1 of FIG. 1 in that it does not include the first low refractive layer 230.

Figure 14:
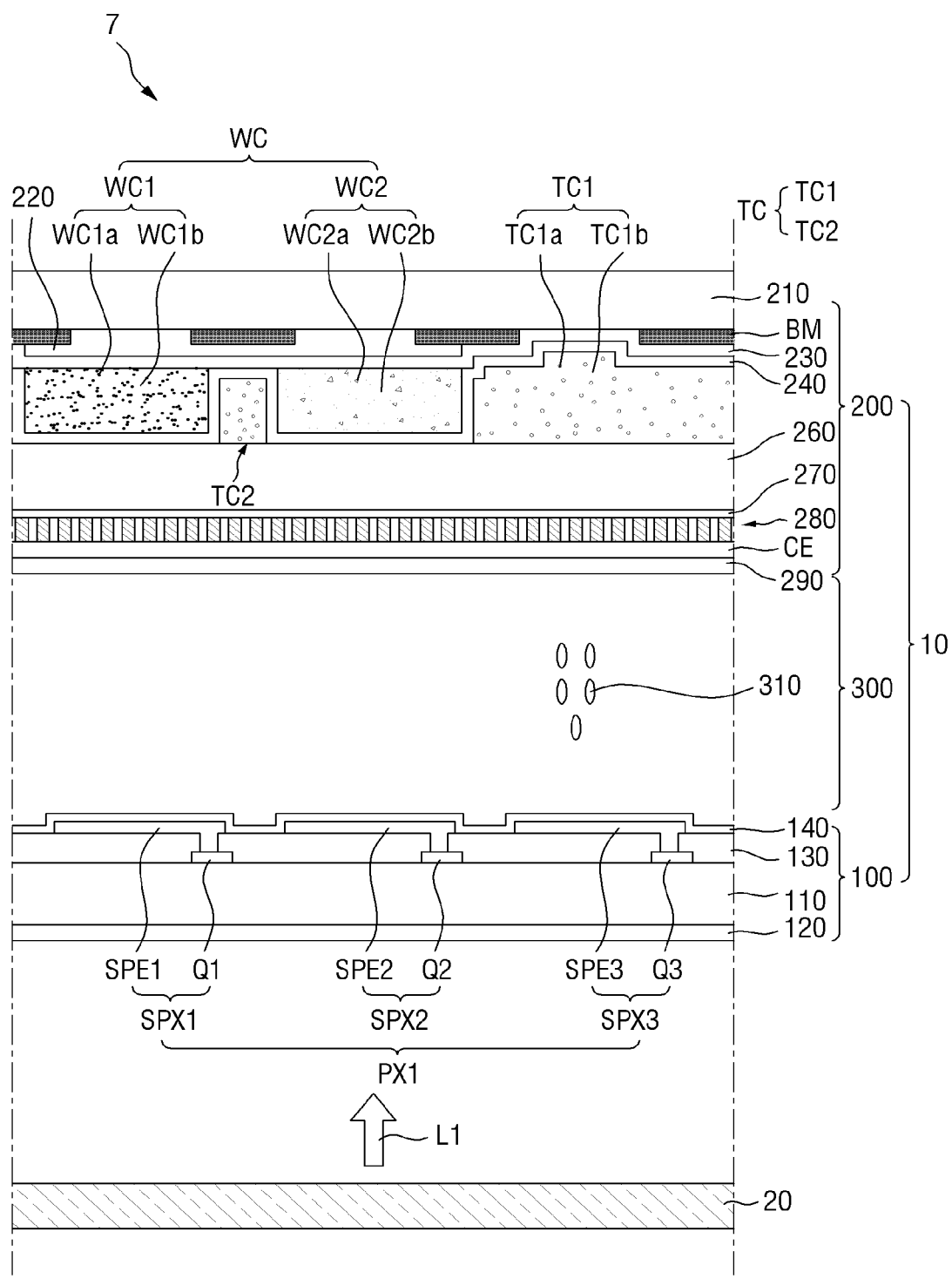

Referring to FIG. 14, a display device 7 according to an embodiment may not include a second low refractive layer 250. That is, the display device 7 of FIG. 14 is different from the display device 1 of FIG. 1 in that it does not include the second low refractive layer 250.

The relationship between the position of a low refractive layer and luminance will now be described in more detail with reference to FIG. 15.

Figure 15:
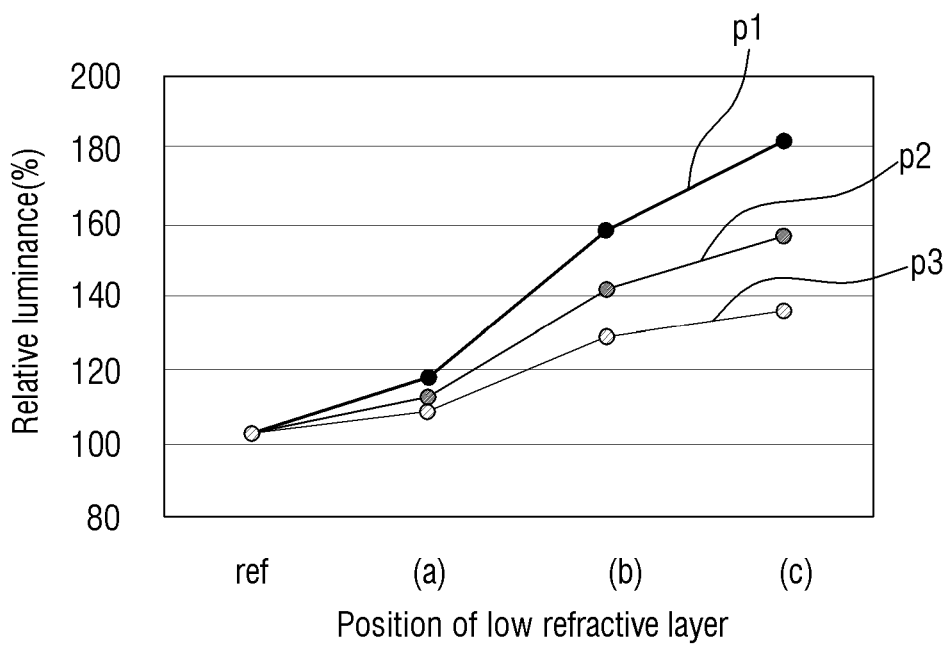
FIG. 15 is a graph illustrating the luminance according to the position of a low refractive layer in a display device according to an embodiment.

FIG. 15 is a graph illustrating the luminance according to the position of a low refractive layer in a display device according to an embodiment. In FIG. 15, ref represents a case where no low refractive layer is included, (a) represents a case where only a first low refractive layer is included, (b) represents a case where only a second low refractive layer is included, and (c) represents a case where both the first low refractive layer and the second low refractive layer are included. In addition, p1 represents a case where the average refractive index is 1,2, p2 represents a case where the average refractive index is 1.3, and p3 represents a case where the average refractive index is 1.4.

Referring to FIG. 15, assuming that the refractive indices are the same, the luminance is highest when both the first and second low refractive layers 230 and 250 are included. In addition, assuming that the number of refractive layers included is the same, the luminance is highest when the average refractive index is lowest, as described above.

Therefore, the display device according to the embodiment can improve luminance by including both the first low refractive layer 230 and the second low refractive layer 250 and minimizing the average of the refractive indices of the first low refractive layer 230 and the second low refractive layer 250. However, the refractive indices of low refractive layers and the positions and number of the low refractive layers can be variously set in consideration of the relationship with other elements, the required luminance, and the production cost.

Figure 16:
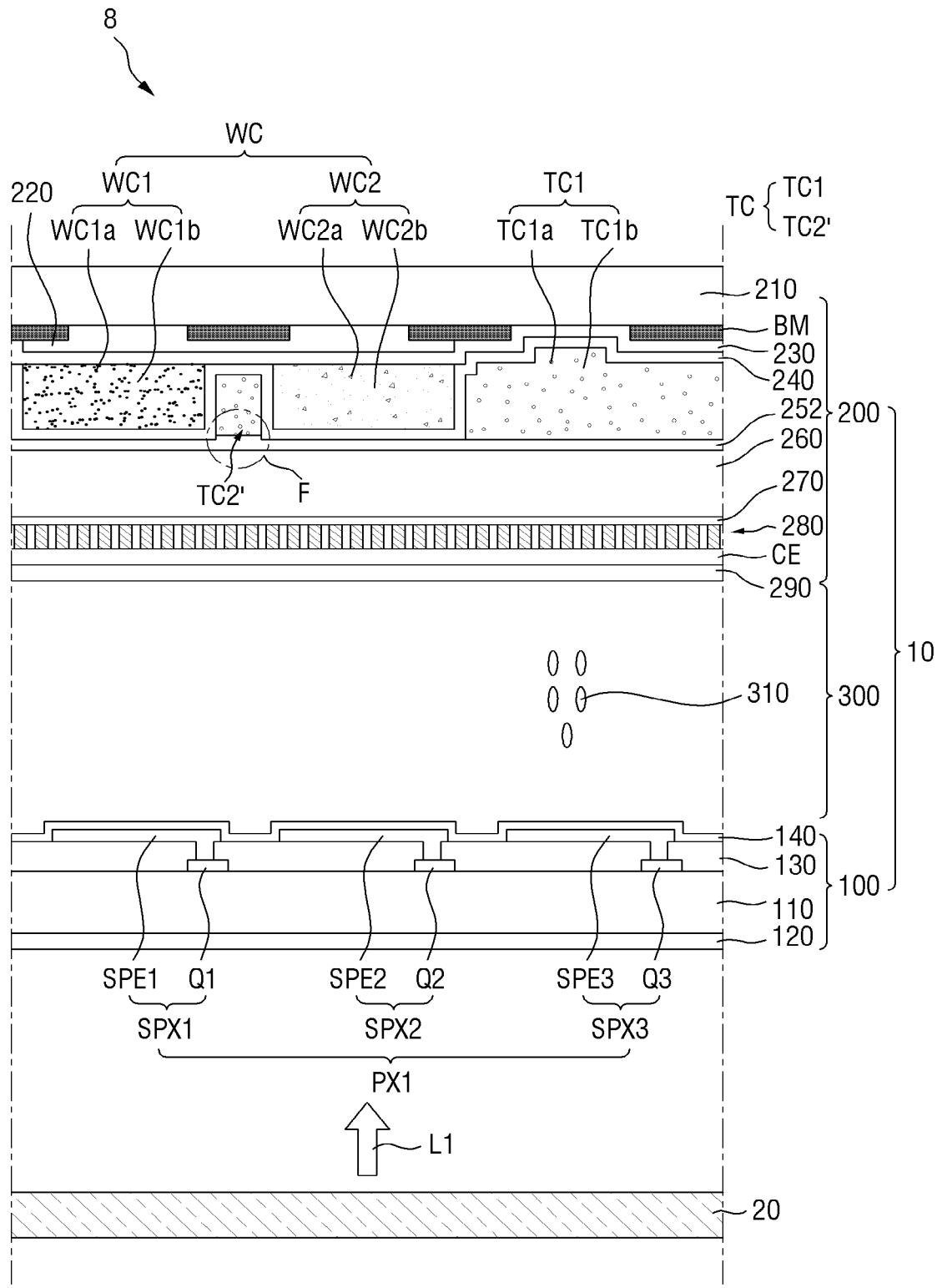
FIG. 16 illustrates an embodiment of the display device of FIG. 1.

FIG. 16 illustrates an embodiment of the display device 1 of FIG. 1.

Referring to an area F of FIG. 16, a display device 8 according to an embodiment may include a second light transmission pattern TC2' and a first light transmission pattern TC1 having different thicknesses. That is, since the second light transmission pattern TC2' is formed in a narrower area than the first light transmission pattern TC1, it may be thinner than the first light transmission pattern TC1. In other words, even if the first light transmission pattern TC1 and the second light transmission pattern TC2' are simultaneously formed through the same process, they do not necessarily have the same thickness.

Hereinafter, a method of manufacturing the upper display panel 200 among the elements of the display device 1 according to the embodiment of FIG. 1 will be described with reference to FIGS. 17 through 22. FIGS. 17 through 22 illustrate a method of manufacturing a display device according to an embodiment. For simplicity, a description of elements and features identical to those described above with reference to FIGS. 1 through 8 will be omitted.

Figure 17:
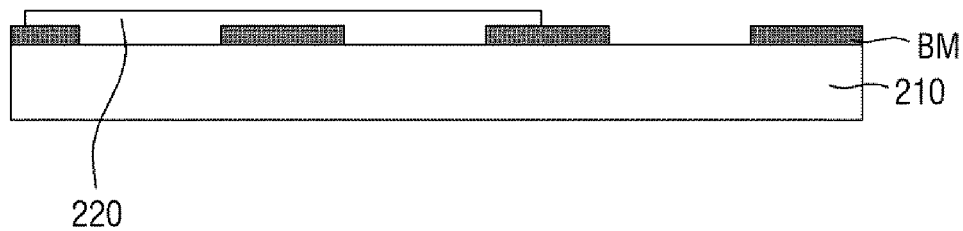
FIGS. 17 through 22 illustrate a method of manufacturing a display device according to an embodiment.

Referring to FIG. 17, the black matrix BM and the first filter 220 are formed on the upper substrate 210. The black matrix 13119 may be formed on the upper substrate 210 to include a plurality of openings. The first filter 220 may be formed on the black matrix BM to vertically overlap the first subpixel electrode SPE1 and the second subpixel electrode SPE2 described above with reference to FIG. 1. That is, the first filter 220 does not overlap the third subpixel electrode SPE3 to be described later.

In an embodiment, the first filter 220 may be formed by forming an organic material having photosensitivity on the entire surfaces of the black matrix BM and the upper substrate 210 and then patterning the organic material such that the first filter 220 is located only in areas vertically overlapping the first sub pixel electrode SPE1 and the second sub pixel electrode SPE2. The organic material having photosensitivity may be a yellow photoresist in an embodiment. In an embodiment, the first filter 220 may be formed by depositing an inorganic material using a method such as chemical vapor deposition. The first filter 220 may be formed as a single layer or may be formed by stacking a plurality of layers. When the first filter 220 consists of a plurality of layers, the transmission wavelength band and the blocking wavelength band of the first filter 220 can be controlled by adjusting the material, the refractive index, the deposition thickness, etc. of each layer.

Figure 18:
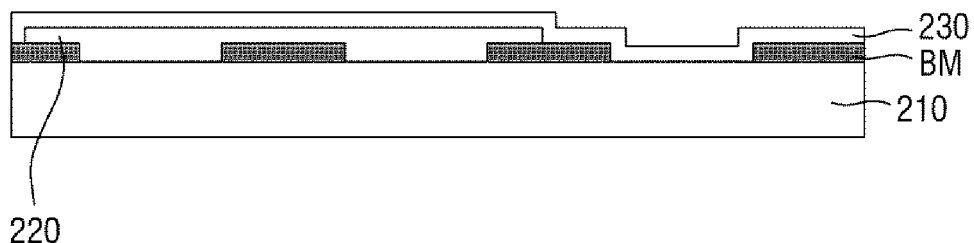

Referring to FIG. 18, the first low refractive layer 230 is formed on the first filter 220, the black matrix BM, and the upper substrate 210. The first low refractive layer 230 may be formed on the entire surfaces of the first filter 220, the black matrix BM and the upper substrate 210 to vertically overlap all of the wavelength conversion patterns WC and the light transmission patterns TC to be described later. The thickness of the first low refractive layer 230 may be about 1 μm or less.

The material of the first low refractive layer 230 is not particularly limited as long as the refractive index of the first low refractive layer 230 is about 1.1 to 1.4. That is, the first low refractive layer 230 may include a resin and nano particles (such as zinc oxide (ZnO) or titanium dioxide ($TiO_2$)) dispersed in the resin. In an embodiment, the first low refractive layer 230 may include one of hollow silica, nano silicate, and porogen. In addition, the first inorganic layer 231 can be formed instead of the first low refractive layer 230.

Figure 19:
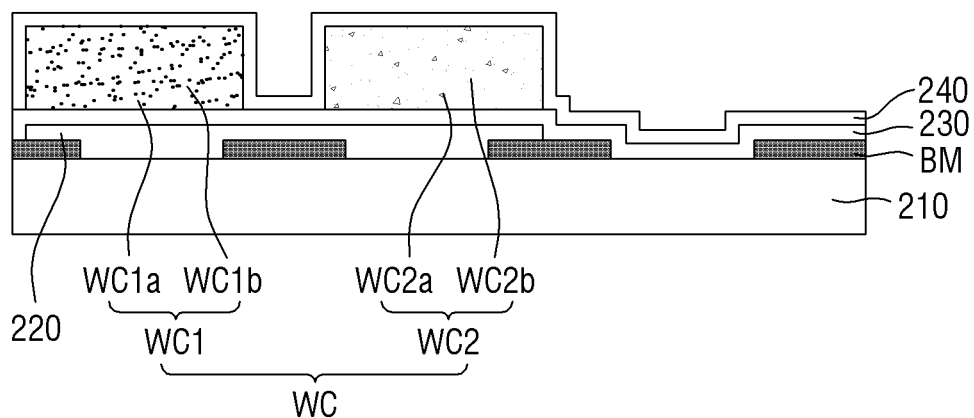

Next, referring to FIG. 19, the first wavelength conversion pattern WC1 and the second wavelength conversion pattern WC2 are formed on the first low refractive layer 230. The formation order of the first wavelength conversion pattern WC1 and the second wavelength conversion pattern WC2 is not particularly limited.

More specifically, a material including a plurality of first quantum dots that convert blue light into red light is deposited on a transparent organic material or a transparent photoresist and then patterned to leave only an area overlapping the first subpixel electrode SPE1 in the direction perpendicular to the lower substrate 110. As a result, the first wavelength conversion pattern WC1 is formed.

In addition, a material including a plurality of second quantum dots that convert blue light into green light is deposited on a transparent organic material or a transparent photoresist and then patterned to leave only an area overlapping the second subpixel electrode SPE2 in the direction perpendicular to the lower substrate 110. As a result, the second wavelength conversion pattern WC2 is formed.

After the formation of the first wavelength conversion pattern WC1 and the second wavelength conversion pattern WC2, the second filter 240 is formed on the first wavelength conversion pattern WC1 and the second wavelength conversion pattern WC2. The second filter 240 may be formed as a single layer or may be formed by stacking a plurality of layers. When the second filter 240 consists of a plurality of layers, the transmission wavelength band and the reflection wavelength band of the second filter 240 can be controlled by adjusting the material, the refractive index, the deposition thickness, etc. of each layer.

Figure 20:
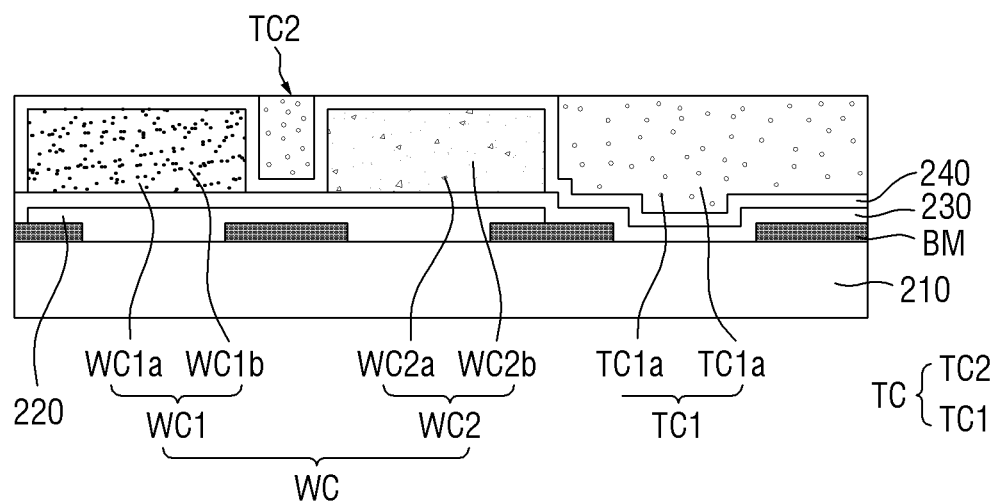

Next, referring to FIG. 20, the light transmission patterns TC including the first light transmission pattern TC1 and the second light transmission pattern TC2 are formed on the second filter 240. The light transmission patterns TC are formed by stacking a material including a light scattering material for dispersing incident light on a transparent organic material or a transparent photoresist and then patterning the stacked material to leave an area overlapping the third subpixel electrode SPE3 in the direction perpendicular to the lower substrate 110 and an area located between the first wavelength conversion pattern WC1 and the second wavelength conversion pattern WC2.

That is, the first light transmission pattern TC1 and the second light transmission pattern TC2 may be formed simultaneously through the same mask process in an embodiment. Accordingly, the first light transmission pattern TC1 and the second light transmission pattern TC2 may be made of the same material. In an embodiment, each of the first light transmission pattern TC1 and the second light transmission pattern TC2 may include the light scattering material TC1a capable of scattering light and the third light transmitting resin TC1b in which the light scattering material TC1a is coordinated.

Figure 21:
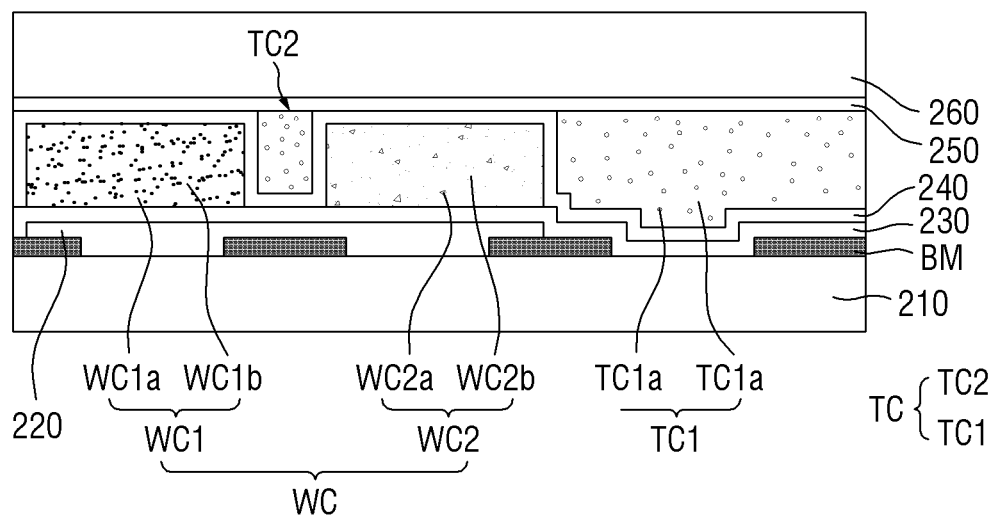

Referring to FIG. 21, the second low refractive layer 250 is formed on the light transmission patterns TC and the second filter 240. The second low refractive layer 250 may be formed on the entire surfaces of the light transmission patterns TC and the second filter 240. The thickness of the second low refractive layer 250 may be about 1 μm or less.

The material of the second low refractive layer 250 is not particularly limited as long as the refractive index of the second low refractive layer 250 is about 1.1 to 1.4. The refractive index of the second low refractive layer 250 may be the same as or different from that of the first low refractive layer 230. In addition, the material of the second low refractive layer 250 may be the same as or different from that of the first low refractive layer 230. For example, the second low refractive layer 250 may include a resin and nano particles (such as zinc oxide (ZnO) or titanium dioxide ($TiO_2$)) dispersed in the resin. In an embodiment, the second low refractive layer 250 may include one of hollow silica, nano silicate, and porogen. In addition, the second inorganic layer 251 can be formed instead of the second low refractive layer 250.

Since the second light transmission pattern TC2 provides flatness to the second low refractive layer 250, the step height of the second low refractive layer 250 can be minimized.

Next, the planarization layer 260 is formed on the second low refractive layer 250. More specifically, the forming of the planarization layer 260 may include applying a planarizing material and curing the planarizing material. The planarizing material may include an organic material such as a thermosetting resin in an embodiment.

As described above, as the step height of the second low refractive layer 250 is minimized, the step height of the planarization layer 260 may also be minimized, thereby improving the flatness of the planarization layer 260.

Figure 22:
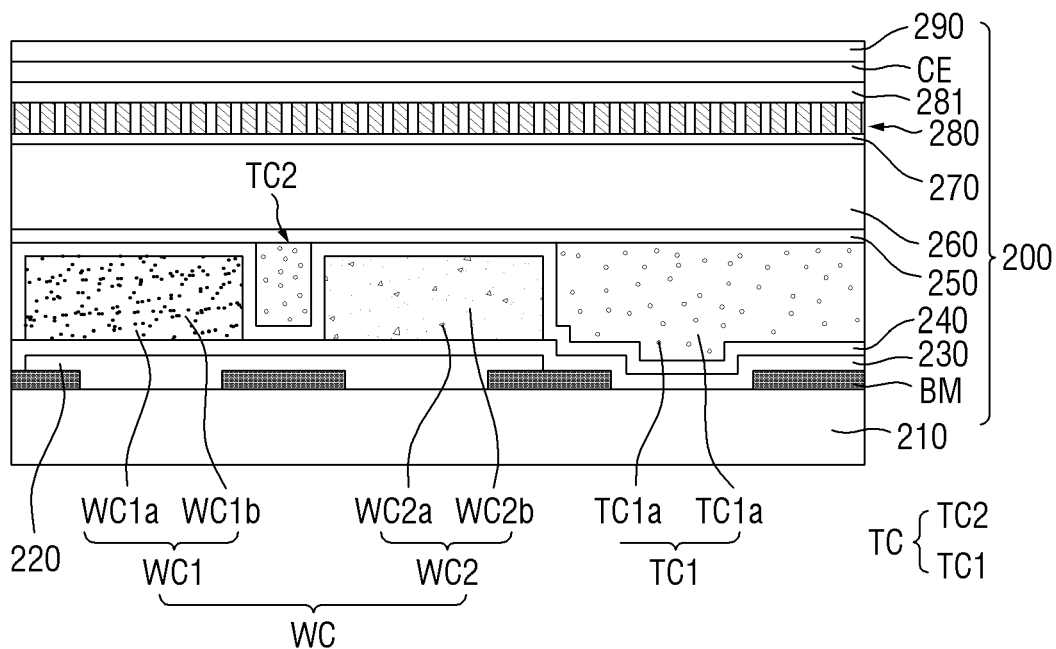

Next, referring to FIG. 22, the second insulating layer 270, the second polarizing layer 280, the capping layer 281, the common electrode CE, and the upper alignment film 290 are formed on the planarization layer 260. Here, since the flatness of the planarization layer 260 has been improved, a plurality of wire grid patterns included in the second polarizing layer 280 can be formed uniformly.

According to embodiments, the light output efficiency can be improved due to the presence of a low refractive layer.

In addition, since a light transmission pattern is placed in a valley area between wavelength conversion patterns, flatness can be given to the low refractive layer and a planarization layer.

Since the thickness of the low refractive layer is minimized, the occurrence of cracks can be reduced, and the cost of forming the low refractive layer can be reduced.

Also, since the thickness of the planarization layer is minimized, the warpage of the planarization layer can be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of manufacturing a display device, the method comprising:
    forming a first low refractive layer on a substrate;
    forming wavelength conversion patterns, which comprise a first wavelength conversion pattern converting light having a first wavelength band into light having a second wavelength band and a second wavelength conversion pattern converting the light having the first wavelength band into light having a third wavelength band, on the first low refractive layer;
    forming light transmission patterns which comprise a first light transmission pattern transmitting the light having the first wavelength band and a second light transmission pattern disposed between the first wavelength conversion pattern and the second wavelength conversion pattern; and
    forming a second low refractive layer on the wavelength conversion patterns and the light transmission patterns,
    wherein refractive indices of the first low refractive layer and the second low refractive layer are lower than those of the wavelength conversion patterns.

2. The method of claim 1, further comprising forming a first filter which is disposed between the first low refractive layer and the wavelength conversion patterns.

3. The method of claim 2, wherein the first filter blocks the light having the first wavelength band and transmits the light having the second wavelength band and the light having the third wavelength band.

4. The method of claim 1, further comprising forming a second filter which is disposed between the wavelength conversion patterns and the light transmission patterns.

5. The method of claim 4, wherein the second filter transmits the light having the first wavelength band and reflects the light having the second wavelength band and the light having the third wavelength band.

6. The method of claim 1, wherein at least one of the first low refractive layer and the second low refractive layer has a refractive index of 1.1 to 1.4.

7. The method of claim 1, wherein at least one of the first low refractive layer and the second low refractive layer comprises one of zinc oxide, titanium dioxide, hollow silica, nano silicate, and porogen.

* * * * *